US008644273B2

(12) United States Patent
Choi et al.

(10) Patent No.: US 8,644,273 B2
(45) Date of Patent: Feb. 4, 2014

(54) METHODS AND APPARATUS FOR OPTIMIZATION OF FEMTOCELL NETWORK MANAGEMENT

(75) Inventors: Hyung-Nam Choi, Hamburg (DE); Maik Bienas, Braunschweig (DE); Achim Luft, Braunschweig (DE)

(73) Assignee: Apple Inc., Cupertino, CA (US)

( * ) Notice: Subject to any disclaimer, the term of this patent is extended or adjusted under 35 U.S.C. 154(b) by 803 days.

(21) Appl. No.: 12/496,550

(22) Filed: Jul. 1, 2009

(65) Prior Publication Data

US 2011/0002314 A1    Jan. 6, 2011

(51) Int. Cl.
*H04W 4/00* (2009.01)
*H04B 15/00* (2006.01)

(52) U.S. Cl.
USPC ........... 370/338; 455/501; 455/502; 455/503; 370/328; 370/332

(58) Field of Classification Search
USPC ........ 455/411, 422.1, 436, 67.11, 561, 562.1, 455/423, 434, 452.1, 501, 507, 502; 370/338, 328, 252
See application file for complete search history.

(56) References Cited

U.S. PATENT DOCUMENTS

| 8,111,655 | B2 * | 2/2012 | Hui ............................... 370/329 |
| 8,126,496 | B2 * | 2/2012 | Brisebois et al. ............. 455/522 |
| 2005/0255890 | A1 | 11/2005 | Nakada |
| 2007/0097939 | A1 * | 5/2007 | Nylander et al. ............. 370/338 |
| 2007/0177501 | A1 * | 8/2007 | Papasakellariou ............ 370/229 |
| 2008/0062151 | A1 * | 3/2008 | Kent ............................. 345/177 |
| 2008/0076425 | A1 * | 3/2008 | Khetawat et al. ............. 455/436 |
| 2008/0181173 | A1 | 7/2008 | Wei |
| 2008/0220764 | A1 | 9/2008 | Bose et al. |
| 2008/0244148 | A1 * | 10/2008 | Nix et al. ....................... 710/313 |
| 2008/0268833 | A1 * | 10/2008 | Huang et al. .................. 455/425 |
| 2009/0047945 | A1 | 2/2009 | Zhang et al. |
| 2009/0086691 | A1 | 4/2009 | Balasubramanian |

(Continued)

FOREIGN PATENT DOCUMENTS

| CN | 101 364 910 | 2/2009 |
| EP | 2 180 640 | 4/2010 |

(Continued)

OTHER PUBLICATIONS

3GPP TR 32.821 V1.0.0: "3$^{rd}$ Generation Partnership Project: Technical Specification Group Services and System Aspects; Telecommunication management; Study of Self-Organising Networks (SON) related OAM for Home Node B (Release 8)". Dec. 2008, XP002596342.

(Continued)

*Primary Examiner* — Kent Chang
*Assistant Examiner* — William Lu
(74) *Attorney, Agent, or Firm* — Fay Kaplun & Marcin, LLP

(57) ABSTRACT

Methods and apparatus that reduce network management overhead required for the operation of wireless femtocells. In one aspect of the invention, a central network entity governs the simultaneous operation of several femtocells by specifying modes of operation, and operational parameters for one or more of the femtocells. In one embodiment, at least one of the specified modes of operation directs a femtocell to operate in a substantially autonomous manner within the network-defined operational parameters. The network-defined constraints are provided to the femtocell for example, responsive to a successful registration attempt.

9 Claims, 14 Drawing Sheets

(56) References Cited

U.S. PATENT DOCUMENTS

| | | | |
|---|---|---|---|
| 2009/0092096 A1* | 4/2009 | Czaja et al. | 370/331 |
| 2009/0129291 A1 | 5/2009 | Gupta et al. | |
| 2009/0156213 A1* | 6/2009 | Spinelli et al. | 455/436 |
| 2009/0245176 A1* | 10/2009 | Balasubramanian et al. | 370/328 |
| 2009/0264077 A1* | 10/2009 | Damnjanovic | 455/63.1 |
| 2009/0286496 A1* | 11/2009 | Yavuz et al. | 455/127.1 |
| 2009/0296635 A1* | 12/2009 | Hui et al. | 370/328 |
| 2010/0002653 A1* | 1/2010 | Agiwal et al. | 370/331 |
| 2010/0020699 A1* | 1/2010 | On | 370/241.1 |
| 2010/0041364 A1* | 2/2010 | Lott et al. | 455/404.1 |
| 2010/0075658 A1* | 3/2010 | Hou et al. | 455/422.1 |
| 2010/0144362 A1 | 6/2010 | Bernard et al. | |
| 2010/0214941 A1* | 8/2010 | Hoole | 370/252 |
| 2010/0273468 A1 | 10/2010 | Bienas et al. | |
| 2011/0002314 A1* | 1/2011 | Choi et al. | 370/338 |

FOREIGN PATENT DOCUMENTS

| | | |
|---|---|---|
| WO | WO2007031957 | 3/2007 |
| WO | WO2008045303 | 4/2008 |
| WO | WO2008140566 | 11/2008 |

OTHER PUBLICATIONS

3GPP TS 36.913, entitled "Requirements for further advancements for E-UTRA (LTE-Advanced).".

3GPP Technical Report TR 25.820, "3G Home Node B Study Item Technical Report" v100 (Release 8).

Technical Standard TS 36.300 agreed in RAN3#61bis and RAN3#62—Chapter 4.6. 3GPP document No. R3-083577.

* cited by examiner

METHODS AND APPARATUS FOR OPTIMIZATION OF FEMTOCELL NETWORK MANAGEMENT

RELATED APPLICATIONS

This application is related to commonly owned U.S. patent application Ser. No. 12/431,588 filed Apr. 28, 2009 and entitled "Methods and Apparatus for Configuration of Femtocells In a Wireless Network", incorporated herein by reference in its entirety.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND OF THE INVENTION

1. Field of Invention

The present invention relates generally to the field of wireless communication and data networks. More particularly, in one exemplary aspect, the present invention is directed to enhanced methods and apparatus for wireless femtocell setup and self-coordination.

2. Description of Related Technology

Universal Mobile Telecommunications System (UNITS) is an exemplary implementation of a "third-generation" or "3G" cellular telephone technology. The UMTS standard is specified by a collaborative body referred to as the $3^{rd}$ Generation Partnership Project (3GPP). The 3GPP has adopted UMTS as a 3G cellular radio system targeted for inter alia European markets, in response to requirements set forth by the International Telecommunications Union (ITU). The ITU standardizes and regulates international radio and telecommunications. Enhancements to UMTS will support future evolution to fourth generation (4G) technology.

A current topic of interest is the further development of UMTS towards a mobile radio communication system optimized for packet data transmission through improved system capacity and spectral efficiency. In the context of 3GPP, the activities in this regard are summarized under the general term "LTE" (for Long Term Evolution). The aim is, among others, to increase the maximum net transmission rate significantly in the future, namely to speeds on the order of 300 Mbps in the downlink transmission direction and 75 Mbps in the uplink transmission direction.

In the incipient version of the LTE specification (Release 8), the 3GPP standards body will formalize requirements for a network element referred to as the "Home enhanced-NodeB" (HeNB). The Home eNodeB (HeNB) will be deployed for LTE based Radio Access Technology (RAT) networks; the HeNB is an evolution of the Home NodeB (HNB), which is its UMTS RAT predecessor. Both HeNBs and HNBs are femtocells that are optimized for use in residential, corporate, or similar environments (e.g., private homes, public restaurants, small offices, enterprises, hospitals, etc., and hence the term "home" of "Home NodeB" is not meant to be limiting to residential applications). In the present context, the terms "Home Base Station", "Home NodeB" (for UMTS), "Home eNodeB" (for LTE), and "femtocell" refer to the same logical entity, and are used interchangeably unless otherwise specifically noted.

Femtocell Operation—

Generally speaking, a femtocell is a base station designed specifically for areas of limited coverage, to service a small number of users (e.g., small business and home environments). A femtocell augments the service provider's existing network of base stations by connecting to the service provider's network via a broadband interface (such as DSL, FiOS, T1, ISDN, or DOCSIS cable modem). Due to the smaller size and lower cost of a femtocell, they can be utilized in areas which are otherwise not feasibly serviced through standard base station deployments (e.g., by extension of indoor service coverage, or temporary service coverage). They also may be portable in nature, and accordingly be repositioned when desired with fairly minimal effort. Various aspects of femtocells are described in greater detail subsequently herein.

The random nature of femtocell deployments creates some unique challenges for network operators. Prior to the deployment of femtocells, base station networks were planned and controlled entirely by the network operator. Physical spectrum was easily controlled by a network operator with fixed base station allocations. In contrast to regular fixed base stations, femtocells are not planned, and in fact may widely vary in usage. Multiple femtocells may be operated simultaneously in a crowded area (such as in an apartment complex) or in relative isolation (e.g., on a farm, etc.). Furthermore, the number of terminal devices supported by each femtocell is widely unpredictable, ranging from a single user (personal use), to many users (e.g., for an enterprise application such as a coffee house or larger business).

Existing methods for spectrum allocation require frequent communications between the femtocell and network operator to allocate/free radio resources. Reducing interference between a femtocell and its neighboring cells requires radio resource setup and management and interference coordination. However, centralized coordination of femtocells results in a significant processing burden on the network operator, including signaling its femtocell interfaces (e.g., due to transmission of power control commands between the network operator and the femtocell). In a large-scale deployment scenario of HeNBs in an LTE network, hundreds (or more) of HeNBs may be deployed within the coverage of a macrocell, with all HeNBs sharing the same licensed spectrum.

The network operator is figuratively pulled in multiple directions: too much supervision is costly in both processing power and network overhead, whereas too little supervision leads to inefficient usage of spectral resources (and perhaps even more dire resource-related consequences such as service delays or outages).

Accordingly, improved methods and apparatus are needed to efficiently manage spectrum allocation for random dispersions of femtocells. Such improved methods and apparatus should provide relatively efficient usage of spectral resources. Ideally, femtocells implementing these methods and apparatus may obtain, use and release spectral resources in a timely fashion; allocated resources which are unused are in effect wasted, which reduces inter alia cost efficiency and profit for the network operator.

Lastly, the improved methods and apparatus should preferably minimize dialogue between the femtocell and the Core Network. Efficient network inter-device communication greatly reduces the Core Network's processing burden for supporting widespread femtocell deployments.

SUMMARY OF THE INVENTION

The present invention satisfies the foregoing needs by providing, inter alia, methods and apparatus for femtocell operation and resource management within a wireless network.

In one aspect of the invention, a method of placing a femtocell of a wireless network into a self-coordinated mode of operation is disclosed. In one embodiment, the method includes: signaling a plurality of parameters to the femtocell, the plurality of parameters comprising: one or more allowed portions of the frequency spectrum to be used; one or more bandwidth sizes within the allowed portions of the frequency spectrum; a temporal parameter; and a maximum allowed transmit power for the femtocell. The self-coordinated mode of operation for the femtocell is constrained at least in part by the plurality of parameters.

In one variant, the temporal parameter includes a maximum allowed duration of operation.

In another variant, the plurality of parameters further includes a carrier frequency to be used by the femtocell.

In yet another variant, the wireless network is an LTE (Long Term Evolution) compliant cellular network, and the femtocell is an HeNB (Home NodeB). Signaling is caused substantially by an EPC (Evolved Packet Core) entity of the LTE-compliant network.

In still a further variant, the method is performed based at least in part on determining at least one of: (i) the presence of potential RF interferers proximate to the femtocell; and/or (ii) the existence of overhead or loading conditions within the network.

In a second aspect of the invention, a method of determining a plurality of parameters for a mode of operation for one or more femtocells is disclosed. In one embodiment, the mode is a self-coordinated mode, and the method includes: determining the number of active femtocells in the vicinity of a newly deployed femtocell associated with a first wireless network operator; determining a network load parameter; determining whether a given frequency spectrum is shared by other wireless network operators; and defining the plurality of parameters, the plurality of parameters enabling operation for respective ones of the one or more femtocells.

In one variant, the number of active femtocells is greater than one, and includes at least one femtocell that is associated with the first wireless network operator, and at least one femtocell that is associated with at least one of the other network operators.

In another variant, the act of determining the number of active femtocells includes evaluating information received from the one or more femtocells relating to received RF signals.

In yet another variant, the act of determining whether a given frequency spectrum is shared includes evaluating information received from the one or more femtocells relating to received RF signals.

In a third aspect of the invention, femtocell apparatus is disclosed. In one embodiment, the apparatus is capable of operating in a self-coordinated mode of operation and includes: a processing device in data communication with a memory; a wireless subsystem; a network interface subsystem capable of communication with a core network of a wireless network; and a plurality of executable instructions resident within the memory. When executed by the processing device, the instructions: receive a plurality of parameters from the core network via the network interface subsystem; autonomously select a frequency part and a size for the operation of the femtocell apparatus based at least in part on the received plurality of parameters; and enable the self-coordinated mode of operation based on the selected frequency part and size for the femtocell apparatus.

In one variant, the plurality of parameters received from the core network comprise: a carrier frequency and a frequency spectrum to be used; one or more allowed portions of the frequency spectrum; one or more bandwidth sizes within the frequency spectrum; a maximum allowed time of operation; and a maximum allowed transmit power for the femtocell apparatus.

In another variant, the apparatus is further configured to communicate with a plurality of user equipment (UE), and arbitrate the allocation of resources between the plurality of UE based on at least one criterion (e.g., a business- or profit-related criterion).

In a fourth aspect of the invention, a method of operating a cellular network having femtocells is disclosed. In one embodiment, the method includes: receiving a registration request from at least one of the femtocells; obtaining information relating to at least: (i) the operating environment of the at least one femtocell; and (ii) the current operational state of a core network; and based at least in part on the information, selectively causing the femtocell to assume one of a plurality of operating modes.

In one variant, the plurality of operating modes comprise: a first mode that allows the at least one femtocell to operate substantially autonomously of the network; a second mode that allows the at least one femtocell to operate at least partly autonomously of the network, the at least partly autonomous operation comprising at least one constraint on the resources accessible by the at least one femtocell; and a third mode that requires the at least one femtocell to operate substantially under control of the network.

In another variant, the act of selectively causing includes: evaluating the information relating to the operating environment of the at least one femtocell to identify the presence of one or more nearby femtocells or other emitters; where the presence of one or more nearby femtocells or other emitters is indicated, determining whether the one or more nearby femtocells or other emitters belong to the same network; and where the one or more nearby femtocells or other emitters belong to the same network, causing the at least one femtocell to assume a network-controlled operating mode, the network-controlled operating mode allowing for selective allocation of resources between the at least one femtocell and the one or more nearby femtocells or other emitters.

In yet another variant, the act of selectively causing further includes: evaluating the information relating to the current operating state of the core network to determine the level of loading or congestion within the core network; and where the loading or congestion within the core network is determined to be sufficiently high, causing the at least one femtocell to assume a partly autonomous operating mode, the partly operating mode allowing for the at least one femtocell to operate with only intermittent communication with the core network.

In a fifth aspect of the invention, network apparatus capable of arbitrating between a plurality of operating modes for a femtocell in communication therewith is disclosed. In one embodiment, the apparatus includes: a processing device in data communication with a memory; an interface subsystem capable of data communication with the femto cell; and a plurality of executable instructions resident within the memory that. When executed by the processing device, the instructions: receive a plurality of information from the femtocell via the interface subsystem; determine one or more internal operational conditions; based at least in part on the received information and one or more internal conditions, select an operating mode for the femtocell; and signal a plurality of parameters to the femtocell according to the selected operating mode.

In one variant, the selection of an operating modes comprise selection of a mode from the group consisting of: a first mode that allows the femtocell to operate substantially autonomously of the network; a second mode that allows the femtocell to operate at least partly autonomously of the network, the at least partly autonomous operation comprising at least one constraint on the resources accessible by the femto cell; and a third mode that requires the femtocell to operate substantially under control of the network.

In another variant, the network is an LTE (Long Term Evolution) compliant cellular network, and the femtocell is an HeNB (Home NodeB). The apparatus includes e.g., an EPC (Evolved Packet Core) entity of the LTE-compliant network.

In yet another variant, the plurality of information includes information relating to the existence of one or more RF emitters proximate to the femtocell.

In a sixth aspect of the invention, a method of operating a cellular network having femtocells so as to reduce network overhead, is disclosed. In one embodiment, the method includes: receiving a registration request from at least one of the femtocells; obtaining information relating to at least: (i) the operating environment of the at least one femtocell; and (ii) the current operational state of a core network; and based at least in part on the information, selectively causing the femtocell to assume one of a plurality of operating modes, the one assumed mode comprising a mode which reduces at least one of the communications and/or network processing overhead necessary to support operation of the femtocell over that associated with network-controlled operating mode.

In a seventh aspect of the invention, a method of operating a femtocell in a self-coordinated mode is disclosed. In one embodiment, the method includes: receiving a plurality of parameters from a central network entity of a wireless network; selecting one or more radio resources for femtocell operation based at least in part on the received plurality of parameters; and responsive to a first trigger condition, re-selecting a one or more radio resources for femtocell operation based at least in part on the received plurality of parameters.

Other features and advantages of the present invention will immediately be recognized by persons of ordinary skill in the art with reference to the attached drawings and detailed description of exemplary embodiments as given below.

DETAILED DESCRIPTION OF THE INVENTION

Figure 1:
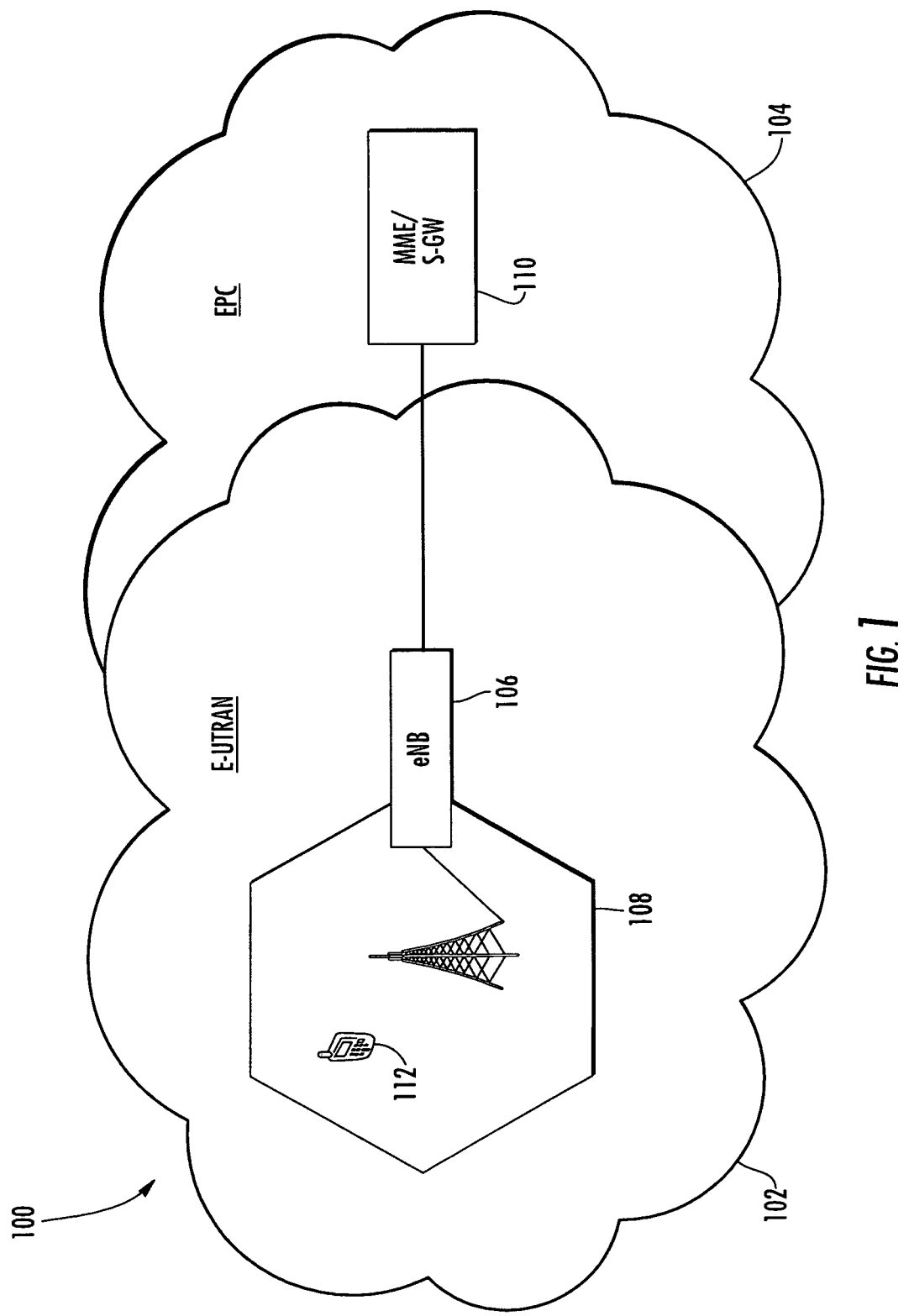
FIG. 1 is a graphical illustration of one embodiment of an LTE network according to the invention comprising an Evolved Packet Core (EPC), and an Evolved UMTS Terrestrial Radio Access Network (E-UTRAN).

Reference is now made to the drawings, wherein like numerals refer to like parts throughout.

Overview

The present invention provides, inter alia, methods and apparatus that reduce network management overhead required for simultaneous operation of wireless femtocells. In one aspect of the invention, a central network entity governs the simultaneous operation of several femtocells by specifying a mode of operation, and operational parameters for one or more of the femtocells. Multiple modes of operation are described, each having different requirements/features for various levels of interaction between the femto cell and the central network entity. The selection of the mode of operation for the femtocell is based in one variant on information provided by the femtocell to the central network entity, and considerations relating thereto. Such considerations may include for example any detected neighboring cells, geographic location, presence of cells from a different network, etc. Furthermore, the selection of operational mode may also be based on internally detected or projected conditions such as: processing burden, messaging overhead, expected network usage, etc.

In another exemplary aspect, modes of operation are disclosed, whereby a femtocell receives one or more ranges of operational parameters from a centralized network entity or proxy entity (e.g., relayed from a base station or another femtocell). The femtocell selects one or more operational parameters from the received ranges. In one embodiment, the selection of one or more operational parameters is based on externally detected conditions such as: cellular bandwidth, current cell usage, etc. In another embodiment, the selection of one or more operational parameters is based on internal femtocell conditions such as: device capabilities, current usage, expected usage, etc. Combinations of the foregoing, and/or other selection criteria, may be used consistent with the invention as well.

In one exemplary implementation, the femtocell is configured to operate in one of at least three distinct modes. The first mode is a network-coordinated mode for which the femtocell has an operational dialogue with the centralized network entity. The second mode is a "standalone" or ad hoc mode, for which the femtocell receives no further operational parameters from the centralized network entity. The third mode is a self-coordinated mode, where the femtocell is provided with one or more ranges for operational parameters, as referenced above. During self-coordinated operation, the femtocell is allowed to regulate its internal operations without substantial input from the centralized network entity. While the central network entity does not manage the minutiae of operations for a self-coordinated femtocell, the centralized network entity retains control over operational parameters and intervenes as necessary.

DETAILED DESCRIPTION OF EXEMPLARY EMBODIMENTS

Exemplary embodiments of the present invention are now described in detail. While these embodiments are primarily discussed in the context of a Home enhanced-NodeB (HeNB) operating within a Long Term Evolution (LTE) network, it will be recognized by those of ordinary skill that the present invention is not so limited, and may be applied to other types and configurations of networks, cellular or otherwise. Moreover, while discussed primarily in the context of communication between a HeNB and an Evolved Packet Core (EPC) resident at the network operator, it is recognized that other implementations of mobile base station (e.g., femtocell, picocell, access point (AP), etc.) functionality or mobile device management functionality could be implemented at other points within the network in accordance with the invention.

In the following discussion, the exemplary cellular radio system includes a network of radio cells each served by a transmitting station, known as a cell site or base station. The radio network provides wireless communications service for a plurality of transceivers (in most cases mobile). The network of base stations working in collaboration allows for wireless service which is greater than the radio coverage provided by a single serving base station. The individual base stations are connected by another network (in many cases a wired network), which includes additional controllers for resource management, and in some cases access to other network systems (such as the Internet) or Metropolitan Area Networks (MANs).

LTE Networks—

FIG. 1 illustrates one exemplary high-level LTE cellular radio system 100 comprising the E-UTRAN (Evolved UMTS Terrestrial Radio Access Network) 102 and the Core Network EPC (Evolved Packet Core) 104. The E-UTRAN consists of a number of base stations (such as eNodeBs (eNBs)) 106. Each base station provides radio coverage for one or more mobile radio cells 108 within the E-UTRAN. In LTE, each eNB is connected to the EPC via a S1 interface. The eNBs directly connect to two EPC entities, the MME (Mobility Management Entity) and the Serving Gateway (S-GW) 110. The MME is responsible for controlling the mobility of UEs 112 located in the coverage area of the E-UTRAN. The S-GW handles the transmission of user data between the UE and the network.

In LTE, there are two distinct types of base stations: eNodeBs (eNBs) 106, and Home eNodeBs (HeNBs). In the present context, the terms "Home Base Station", "Home NodeB" (for UMTS), "Home eNodeB" (for LTE) refer generally to femtocell type equipment, and the terms "NodeB" and "eNodeB" (for LTE) refer generally to macrocell type equipment.

Generally, HeNBs are miniaturized or reduced-feature versions of base stations designed specifically for areas of limited coverage, to service a small number of users (e.g., small business and home environments). Unlike eNBs 106, HeNBs are connected to the EPC 104 over a fixed broadband access network (e.g., DSL, cable modem, etc.). Furthermore, operators and owners of the HeNB (also referred to as the "hosting party") are typically able to control access to the radio resources provided by the HeNB. However, a HeNB is similar to an eNB, in that they both operate within a licensed spectrum, and are coordinated by the EPC. Also, full mobility into and out of a HeNB's coverage is supported, including service continuity if applicable.

Base stations (both macrocells and femtocells) transmit control and user data to UE (User Equipment) 112 over an air interface (i.e., a radio interface). The LTE Radio Access Technology (RAT) specifies downlink radio transmissions (i.e., base station to UE) based on OFDMA (Orthogonal Frequency Division Multiple Access) in combination with TDMA (Time Division Multiple Access). OFDMA/TDMA is a multicarrier, multiple user access method which provides each subscriber a number of subcarriers in the frequency domain for a defined transmission time. The uplink direction (i.e., UE to base station) is based on SC-FDMA (Single Carrier Frequency Division Multiple Access)/TDMA.

Figure 2:
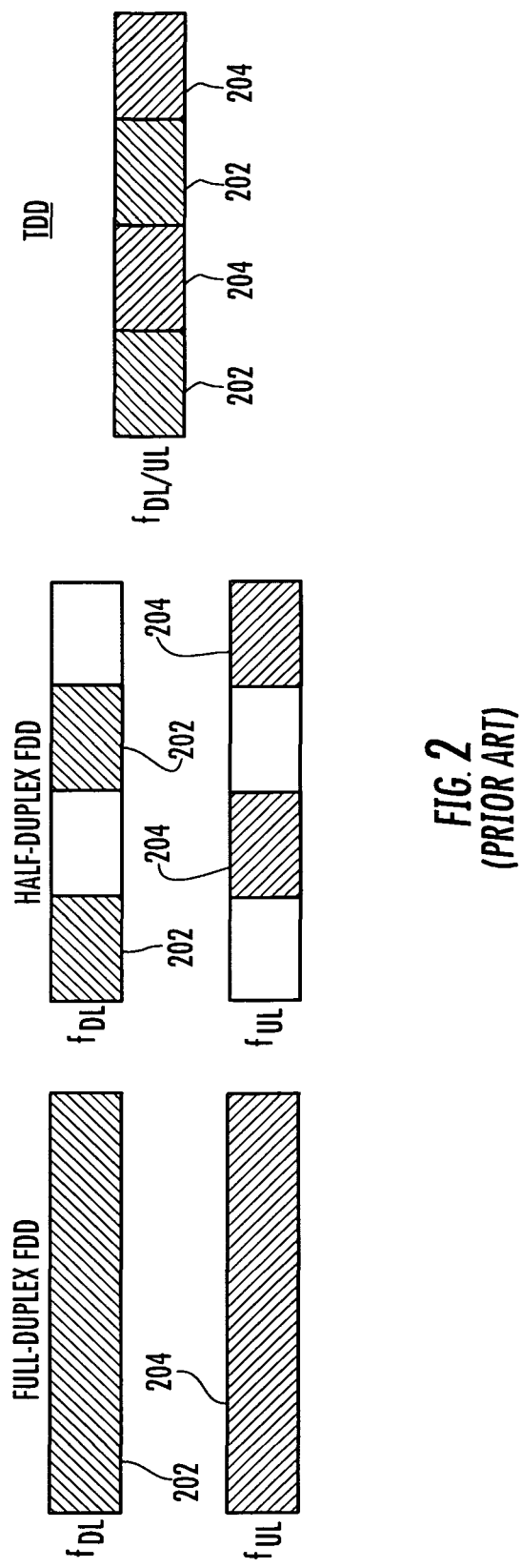
FIG. 2 is a graphical representation of various prior art duplex methods including full-duplex FDD (frequency division duplexing), half-duplex FDD, and TDD.

The LTE RAT additionally supports various duplexing modes. As shown in FIG. 2, LTE supports: full-duplex FDD (Frequency Division Duplex), half-duplex FDD and TDD (Time Division Duplex). Full-duplex FDD uses two separate frequency bands for uplink 204 and downlink 202 transmissions, and both transmissions can occur simultaneously. Half-duplex FDD also uses two separate frequency bands for uplink 204 and downlink 202 transmissions, but both transmissions are non-overlapping in time. TDD uses the same frequency band for transmission in both uplink 204 and downlink 202. For TDD, the direction of transmission is switched between uplink and downlink within a given time frame.

Figure 3:
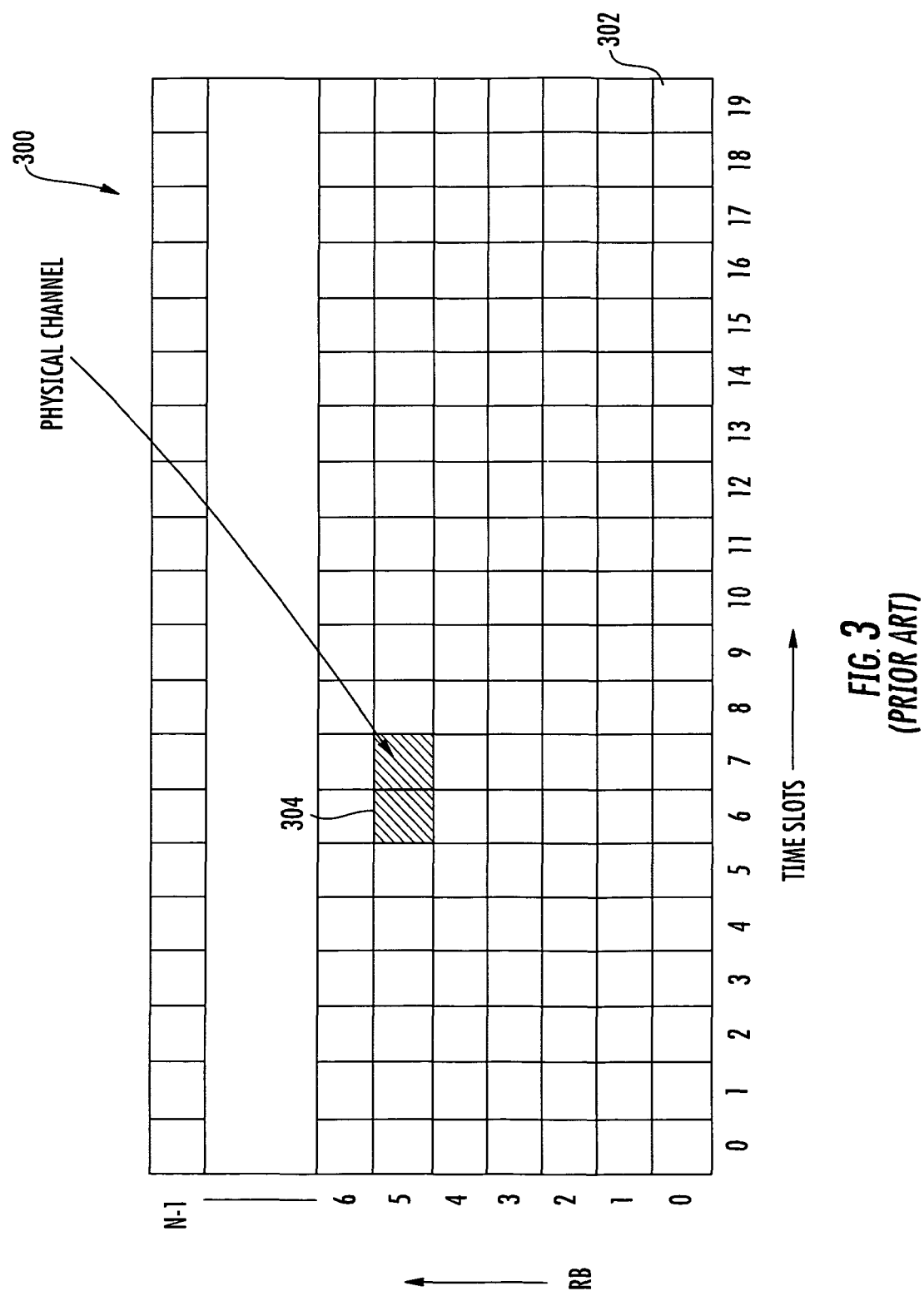
FIG. 3 is prior art graphical representation of resource blocks as represented in time and frequency resources in Orthogonal Frequency Division Multiple Access/Time Division Multiple Access (OFDMA/TDMA) schemes.

FIG. 3 illustrates one exemplary time-frequency representation of an LTE Radio Access Technology (RAT) 300. In the frequency-domain, the available spectrum is separated into so-called "Resource Blocks" (RB) 302. A RB in this implementation is 180 kHz and consists of twelve (12) subcarriers. The time-domain is separated into radio frames of length 10 ms. Each radio frame consists of 20 (twenty) time slots of length 0.5 ms, numbered from 0 to 19. A subframe is two consecutive time slots. So, for example, for full-duplex FDD, 10 (ten) subframes are available for downlink transmission and 10 (ten) subframes are available for uplink transmission in each 10 ms interval. A physical channel 304 corresponds to a set of resource elements (e.g. RB 5 during time slot 6-7) carrying information.

The flexibility of OFDMA/TDMA enables LTE to support varying bandwidths of 1.4 MHz, 3 MHz, 5 MHz, 10 MHz, 15 MHz, and 20 MHz. Multiple discrete sections of bandwidth may also be aggregated to form a larger bandwidth. For example, twenty-five (25) RBs can support a 5 MHz band, and 110 RBs can support a 20 MHz band. These two bands could be used together to form a 25 MHz aggregate bandwidth.

LTE-Advanced Networks—

The ITU-R (International Telecommunications Union—Radio Communication Sector) has specified a series of radio interface technology requirements, broadly referred to as "IMT-Advanced". One key objective of IMT-Advanced is the development of mobile radio communication systems that exceed the capabilities of IMT-2000 systems such as UMTS and CDMA2000. Generally, IMT-Advanced is concerned primarily with user trends, and the evolution of technology improvements. Key features to be supported by candidate IMT-Advanced systems should include: high quality mobile services, worldwide roaming capabilities, and peak data rates of 100 Mbps in high mobility environments, and 1 Gbps for low mobility environments.

Current development efforts of the 3GPP are focused on improvements to existing LTE standards to meet the new IMT-Advanced radio interface technology requirements. These development efforts are generally referred to as "LTE-Advanced" (see, e.g., RP-080137 to NTT DoCoMo et al., entitled "Further advancements for E-UTRA (LTE-Advanced)", which is incorporated herein by reference in its entirety). Proposals for LTE-Advanced are directed to improving spectral efficiency, cell edge throughput, coverage and latency (see, e.g., 3GPP TS 36.913, entitled "Requirements for further advancements for E-UTRA (LTE-Advanced)" which is also incorporated herein by reference in its entirety). Some candidate technologies in consideration for inclusion in LTE-Advanced proposals include multi-hop relay, MIMO (Multiple Input Multiple Output) antenna technologies, spectrum aggregation, flexible spectrum usage and/or spectrum sharing, and Inter-Cell Interference (ICI) management.

As previously mentioned, the incipient version of the LTE specification will formalize requirements for Home enhanced-NodeBs (HeNBs) which are small low-power base stations designed for use mainly in home and business environments (e.g., in multi-dwelling or user buildings). HeNBs will improve the coverage and capacity of cellular and fixed networks, and may also provide attractive services to customers at reduced costs. The incipient LTE specification identifies several key characteristics of HeNBs, which include: a secure connection to the Evolved Packet Core (EPC) over a fixed broadband access network (e.g. DSL, cable modem, etc.), EPC coordinated operation within the licensed spectrums, full mobility capability (including service continuity where applicable), and hosting party access control (the hosting party may include operators and owners of HeNB) to radio resources provided by the HeNB, although it will be appreciated that these features are in no way a requirement of practicing the various aspects of the present invention.

Femtocell Crowding—

In one exemplary usage case, a user of a mobile phone or other User Equipment (UE) might wish to augment their wireless coverage by deploying a HeNB in their premises (e.g., apartment, small business, corporate enterprise, hospital, etc.). In one scenario, the user employs a DSL, T1, ISDN, DOCSIS, microwave link, or other such connection to connect the HeNB to the operator's Core Network. HeNBs, and other femtocell type devices, benefit both the operator and the user. The user benefits from the improved indoor network coverage, as well as increased traffic throughput capabilities. Furthermore, the user's UE will have a longer standby battery life, because power consumption can be reduced due to the improved radio link quality (i.e., improved Signal to Noise Ratio (SNR)). The network operator obtains additional network coverage area (see, e.g., 3GPP Technical Report TR 25.820, "3G Home Node B Study Item Technical Report" v100 (Release 8), which is incorporated herein by reference in its entirety, as well as changes to Technical Standard TS 36.300 agreed in RAN3#61bis and RAN3#62-Chapter 4.6. 3GPP document number: R3-083577, the contents of which are also incorporated herein by reference in their entirety). Finally, both the home user and the network operator can fully utilize cellular equipment technology improvements, independent of the larger network capabilities and requirements for infrastructure upgrades.

Unfortunately, as previously noted, network management issues are greatly complicated with the unpredictability of user controlled femtocell operation. Femtocells may be randomly scattered geographically. HeNBs are also portable and may be adapted for "nomadic" use; e.g., a user may operate the HeNB one day in his/her apartment, and the next day on a business trip in a hotel. Additionally, femtocells are not always operating. A HeNB may be unpredictably powered on or off at the user's discretion (e.g., switched on and off from at night, or when the user is not present). Femtocells also may vary widely in population density. For example, several HeNBs may operate concurrently in an apartment or hotel, whereas a home user may use a single HeNB in isolation.

Figure 4:
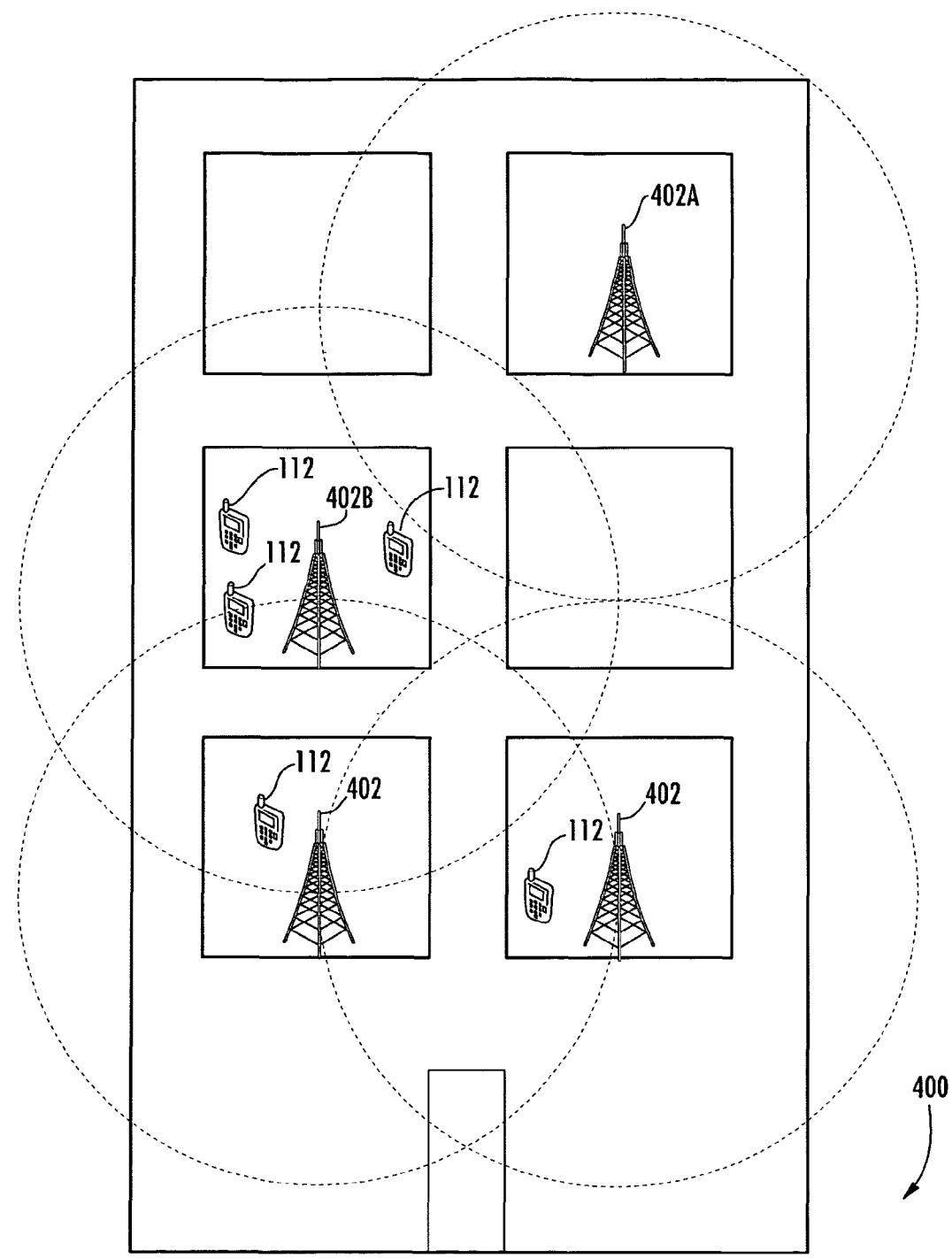
FIG. 4 is a graphical illustration showing one exemplary randomized deployment of LTE HeNBs.

FIG. 4 illustrates one exemplary "randomized" HeNB deployment 400, and the potential "crowding" problems that random distributions of HeNBs may cause. An apartment building has several HeNBs 402 located throughout with varying numbers of connected User Equipments (UEs) 112. Each HeNB 402 has a potential coverage area which may interfere with other HeNB's. In this exemplary case, a first HeNB 402A is serving no users, and is thus requires very little spectrum to operate, whereas a second HeNB 402B is serving multiple users, and may require significant amounts of spectrum. Ideally, the second HeNB 402B should be allocated a larger portion of the total spectrum resources than the first HeNB 402A.

The current LTE specifications do not pre-suppose any methods for spectrum allocation; consequently, the network operator may freely manage its spectrum allocation however it chooses. For example, a first network operator may choose to assign all eNodeBs 106 (or HeNBs 402) the same frequency band, whereas a second network operator may assign each eNodeB (or HeNB) a separate frequency band. HeNBs must flexibly adapt to comply with the spectrum allocation of its surrounding network.

Accordingly, one of the major issues for the successful deployment of HeNBs 402 is the avoidance of interference (spectrum management) created by a HeNB to its neighboring macrocells (e.g., NBs, eNBs 106, etc.) and neighboring femtocells (e.g., HeNBs, etc.). Spectrum management for any significant number of HeNBs 402 is costly from the network operator's point of view for a number of reasons. First, unlike standard eNBs which provide service to many users over large areas, HeNBs 402 have very focused and localized areas of effectiveness for a relatively small number of users (even in a "dense" application such as an apartment building). In fact, allocating spectrum for HeNBs should often be done sparingly, as HeNBs are generally unused most of the time. Secondly, unlike eNBs which are fixed structures with static environments, HeNBs may have constantly or periodically changing physical and use environments; thus, spectrum management for HeNBs can be a constant and significant addition to the network operator's overhead.

In large-scale deployment scenarios of HeNBs 402, hundreds of HeNBs may be deployed within the coverage of a single macrocell. The EPC 104 controls the HeNBs (e.g., radio resource setup, management, interference coordination, etc.); however, the centralized processing requirements present a significant burden on the EPC. Furthermore, copious amounts of signaling may clutter or clog the interface between the EPC and the plurality of HeNBs. Relatively frequent transmissions (even when very simple or low-bandwidth, such as transmission of power control commands), may become unwieldy in large numbers.

Even minor optimizations of HeNB/EPC communications may have profound efficiency impacts. To these ends, improved methods and apparatus are disclosed herein for, inter alia, enabling the self-coordinated operation of HeNBs 402. Self-coordinated operation of HeNBs reduces the processing required of the EPC 104 (in effect, distributing the processing to HeNBs or other proxy entities), and minimizes signaling between the EPC and HeNB.

Furthermore, a standalone or ad hoc mode is also disclosed herein. Advantageously, such standalone operation does not require any communication with the EPC (or at least very infrequent communication, depending on configuration), thereby further reducing overall network overhead.

Such reduced supervision operation of HeNBs 402 and may be beneficial to both the EPC 104 and HeNBs in a wide variety of deployment scenarios. For example, self-coordinated operation may reduce setup issues caused by nomadic usage of HeNBs (e.g., operated temporarily, or geographically different areas); the nomadic HeNB will not be required to "call home" to resolve setup issues, but rather can substantially resolve them itself. In another example, self-coordinated operation may improve spectral efficiency when the licensed or unlicensed spectrum of the HeNBs is shared between many operators (i.e., no single party controls the entire spectrum). In yet another example, ad hoc networks may freely operate without interconnection to the operator's core network at all.

Self-Coordinated and Ad Hoc Femtocells—

The following describe two exemplary scenarios illustrating one or more useful aspects of the invention disclosed herein.

In a first exemplary scenario, a self-coordinated femtocell is disclosed which can switch between at least a first network-controlled mode of operation, and a self-coordinated mode of operation. The switch of mode of operation is based on one or more different factors, such as for example: (i) the number of active femtocells in the nearby (e.g., prescribed) vicinity, (ii) the actual or anticipated network load, (iii) statistics regarding usage, and/or (iv) spectrum considerations (e.g., RF spectrum shared with other operators, restrictions on allocation/use, etc.).

During self-coordinated operation, the femtocell may receive one or a number of restrictions to maintain compliance within the larger cellular network. These parameters may be signaled from the core network to the femtocell during the registration procedure, or at other times (and even via other entities such as a proxy node). Exemplary parameters may include for example: carrier frequencies, allowed bandwidth sizes, maximum allowed time of operation, maximum allowed transmit power, etc. The femtocell autonomously sets its radio for compliant operation (e.g., frequency ranges, bandwidths, length of operation, etc.), without further exchanges with the core network. Furthermore, during operation, the femtocell may dynamically alter its radio operation, within the compliant ranges without further exchanges with the core network. Such autonomous reconfiguration may be useful, when the quality of service of an established call between a femtocell and a mobile subscriber degrades unexpectedly. In some cases, the femtocell may re-register with the core network for updated parameters (such as after the expiration of a timer, or periodically triggered refreshes, event-related triggers, etc.).

In a second exemplary scenario, the femtocell may additionally be switched to a third ad hoc networking mode; i.e., operate in complete isolation from the core network. In ad hoc network operation, the operation of the femtocell is configured manually by the hosting party or in some cases, predefined by the operator. Exemplary parameters may include the aforementioned: carrier frequencies, allowed bandwidth sizes, maximum allowed time of operation, maximum allowed transmit power, etc.

In both the first and second exemplary scenarios, the communication between the core network and the femtocell is greatly reduced. Accordingly, the core network minimizes its overall processing overhead. The core network does not need to track, manage, or control each femtocell (or, in certain implementations, such tracking, management, and control are substantially reduced over prior art approaches). Such reduced supervision operation provides impetus for greatly improved nomadic usage of femtocells, and/or shared spectrum deployments; i.e., the invention-enabled femtocell can operate in intermittent or unstable environments (e.g., nomadically, or in shared spectrum deployments) without constantly requiring core access supervision.

It will be recognized that while various of the embodiments presented herein are described within the context of network-controlled and fully self-coordinated operation, various grades or levels of autonomy are contemplated consistent with the invention (e.g., fully autonomous, partially autonomous with regards to feature "A" but not with respect to feature "B", and so forth) as desired by the network operator deploying the femtocell.

Methods—

Figure 5:
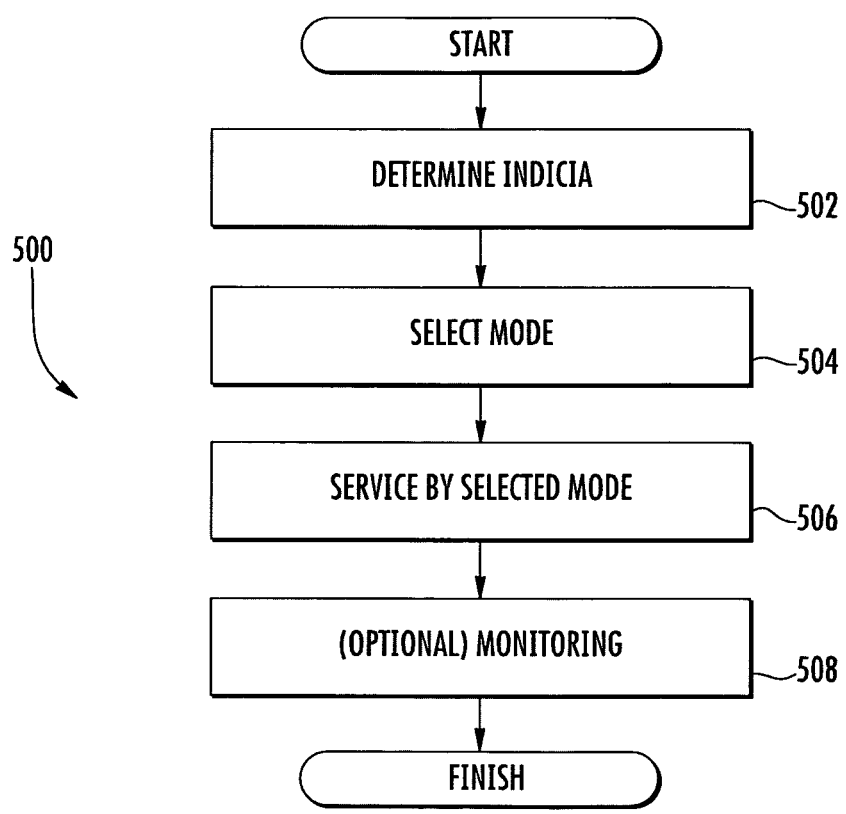
FIG. 5 is a logical flow diagram of an exemplary embodiment of the generalized process for enabling operation modes to reduce network overhead, in accordance with the principles of the present invention.

Referring now to FIG. 5, one exemplary embodiment of the generalized method 500 for reduced supervision setup and operation of femtocells according to the invention is described.

At step 502 of the method 500, one or more indicia useful for determining an operational mode are identified. In one embodiment, one or more indicia are fetched from a femtocell. For example, such indicia might comprise for example (and without limitation): (i) the existence or planned use of active neighboring macrocells and/or femtocells, (ii) detected or projected network load, (iii) detected or projected statistics related to time of operation of neighboring cells, (iv) one or more characteristics of the detected or projected RF spectrum (e.g., local restrictions, nearby cells from other network operators, licensed/unlicensed usage, Rayleigh or other fading characteristics or anomalies (e.g., as a function of frequency), etc.), and/or (v) femtocell specific information, (e.g., expected time of operation of the cell under consideration, one or more capabilities of the femtocell, operator account information, current location, femtocell ID, etc.).

Figure 6:
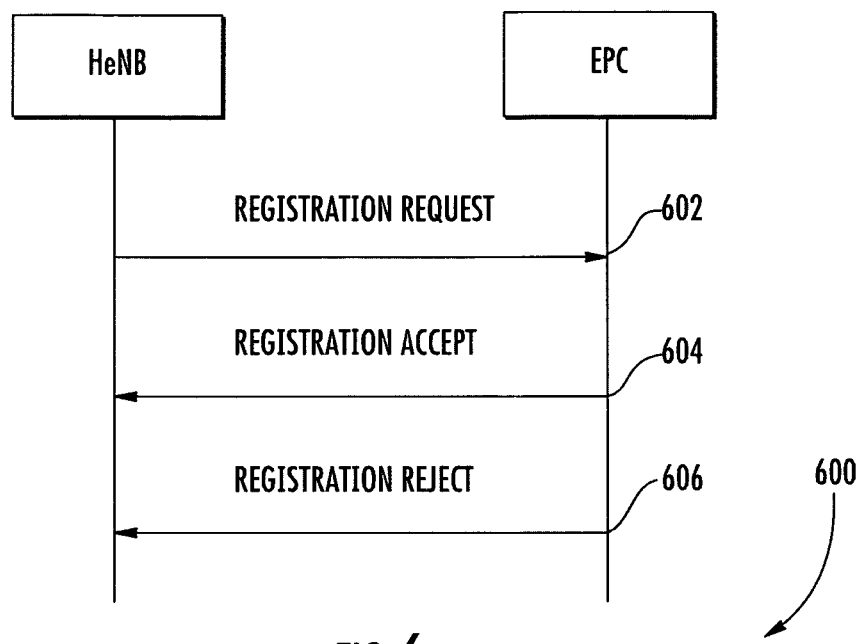
FIG. 6 is a graphical representation of one embodiment of a femtocell registration process useful with the present invention.

In one embodiment, such indicia may be sent or received during femtocell initialization. For example, FIG. 6 illustrates one exemplary simplified message exchange 600 between a HeNB 402 and an EPC 106 during an initial registration event with the network. The HeNB registration procedure informs the EPC that a HeNB is available at a particular IP address. At step 602, the HeNB sends a Registration Request (RR) message to the EPC. The RR message contains location information (e.g., detected macro cell identities, geographical coordinates via use of GPS, IP address), and identity of the HeNB. It will be appreciated however, that other mechanisms for sending the aforementioned indicia between the entities can be used consistent with the invention, such as via other established signaling protocols, via a third party (e.g., femtocell-to-proxy-to-EPC), and so forth.

Referring back to FIG. 5, at step 504 an operational mode is selected from a plurality of modes, where the selected operational mode for the femtocell is determined based at least in part on the one or more indicia identified in step 502. In one embodiment, the plurality of modes includes at least a first mode and a second mode, where the first and second modes differ in the level or type of active network supervision required. In one exemplary variant, the operational mode may be selected from three available modes: (i) network-coordinated, (ii) self-coordinated, and (iii) ad hoc operation.

Ad hoc operation provides cellular access to subscribers, where the cell is not "coupled" to the network; e.g., the cell internally selects its own frequency, and may have its own timing, etc.

Self-coordinated operation advantageously enables a femtocell to provision service to one or more cellular subscribers without requiring substantial network supervision; a self-coordinated cell receives one or more self-coordination parameters from the network. These self-coordination parameters are used autonomously by the femto cell to self-govern operation. The self-coordination parameters originate from the core network, enabling the core network to limit or "shape" (to a degree) the operation of the femtocell according to an operating plan, or to achieve other goals such as maximal spectral access, etc.

Network-coordinated operation enables a femtocell to provision service to one or more cellular subscribers as an extension of the existing cellular network. Network coordination of femtocells is governed by the core network, and may incur significant management overhead. The core network has full control over the operation of the femtocell.

In one embodiment, the operational modes are selected based on the identified femtocell indicia. For example, in one exemplary variant, a centralized network entity (e.g., part of EPC) selects an operational mode for the femtocell based on one or more identified indicia, such as Items (i)-(v) described above with respect to step 502.

In another variant, a centralized network entity selects an operational mode for the femtocell based on both (a) one or more identified indicia, and (b) one or more of its own "internal" considerations. These internal considerations may include one or more (4 e.g.: network congestion, internal processing load, anticipated network burdens, etc. It will be recognized that the term "internal" as used herein refers without limitation to considerations that relate to the network, or portions thereof, which are outside of the femtocell, as contrasted with those relating to the femtocell only.

For example, if a new femtocell identifies a large number of neighboring active cells which are operated by its own carrier network, then the central network entity may opt to initiate network-coordinated operation. The core network can easily juggle the network radio resources to fit the new femtocell. If however, the new femtocell identifies a mixed network of neighboring cells (i.e., both from its own carrier network, and another carrier network), the central network entity may opt to assign self-coordinated operation for the femtocell. In this mode, the femtocell's core network has partial control over the femtocell's environment, but the femtocell is also affected by nearby interference outside of its core network's control. Accordingly, the femtocell may be granted some amount of leeway to suit its requirements. If the femtocell identifies no nearby cells of its own carrier (e.g., operating in a remote location, or operating exclusively in the midst of another carrier's network, etc.), then the femtocell or central network entity may select the ad hoc mode of operation. In such "isolation" cases, the femtocell derives little if any benefit for radio resource management from being connected to the core network. Generally, when a femtocell is isolated from its own network, its own network has very little (if any) say over the radio resources available for the femtocell. In fact, in some embodiments, the femtocell may not even attempt an initial registration with the core network.

In another example, a new femtocell is initialized in the midst of its existing carrier radio access network, and the femtocell provides a scan of the radio access network load to the core network (e.g., via its installed transceiver). If the radio access network load is high, the core network may determine that the femtocell should operate in network-coordinated mode so as to frequently arbitrate for usable radio resources and manage potential conflicts. If the core network determines that the detected radio access network load is moderate, then the core network may assign the femtocell to self-coordinated operation in order to minimize unnecessary network management traffic, while still retaining some limited degree of control. If the core network determines that the detected radio access network load is low (or unutilized), the core network may allow the femtocell to operate in ad hoc mode. It will be appreciated that the foregoing selection process may also be applied dynamically and/or over a prescribed period of time, such as where the core network changes the femtocell's operating mode as a function of day (or time of day) based on changes in detected RF spectrum loading, or where the core network averages the detected loading over a period of time in order to make a current decision on a desirable operating mode.

In yet another example, a new femtocell is initialized, but the core network is already overburdened with internal operations. In such a case, the core network may simply set the femtocell to a reduced supervision setting (e.g., either ad hoc or self-coordinated mode), and revisit the selection of operation mode for the femtocell at a later point (e.g., when internal operations have settled).

In a further example, the femtocell and core network may each be tasked with processing data necessary for determination of an optimal mode; i.e., each may contribute to the decision-making process. While this approach may cause a temporary increase in signaling between the two nodes (e.g., to negotiate a mode), this increase in signaling will rapidly subside once the mode is selected, thereby accruing the benefits afforded by the invention as previously described.

As the aforementioned examples illustrate, in various embodiments, the determination of operational mode may be performed by the femtocell, the core network, or combinations thereof. Furthermore, while each of the aforementioned scenarios are performed using relatively few indicia, it is appreciated that in some embodiments multiple different indicia may be used to in a weighted or other manner to determine the femtocell's operational mode.

To this end, the present invention contemplates in one variant the use of a hierarchical or other weighting algorithm which can, inter alia, determine and assign the appropriate weighting for indicia used in the selection of appropriate operational modes and parameters. The analysis of the received indicia can be based on any number of paradigms; e.g., a running analysis of actual aggregate network activity, pattern matching behaviors (for example, matching received measurements to archetype profiles), mathematical averaging of values over time, etc.

It will further be appreciated that the femtocell may provide updates (based on new measurements, changing conditions, etc.) such as those referenced above on a regular (e.g., periodic) or irregular basis, or correlated with the occurrence of certain events.

Referring back to the illustrated embodiment of FIG. 6, at step 604 the EPC 104 uses the infatuation from the Registration Request message to determine access control policies for the HeNB 402 (e.g. whether a particular HeNB is allowed to operate in a given location, etc). If the EPC accepts the registration attempt, it responds with a Registration Accept message. If the EPC rejects the registration request (e.g., due to network congestion, unauthorized HeNB location, failure to authenticate, etc.), it responds with a Registration Reject message (step 606). In the illustrated embodiment, the registration accept message includes an assignment to an operational mode. It is appreciated that in other embodiments, a separate message may be sent designating an operational mode, whether from the EPC or a designated proxy or third party entity.

At step 506 of the method 500 of FIG. 5, the femtocell provisions services to its subscribers based on the determined operational mode. In one aspect of the present invention, the provisioning of service is performed with one or more operational parameters for use with the operational mode. The operational parameters are adapted for example to substantially reduce the supervisory actions of the central networking entity. In one variant, the operational parameters may comprise one or more flexible or single value settings. As used herein, "single value" parameters may include but are not limited to: Boolean values (e.g., true/false), fuzzy logic or other specified values (e.g. "enabled", "disabled", "enhanced", "public", "high", "medium", etc.), numeric values (e.g., 0 through 10), etc. Similarly, as used herein "flexible" parameters may include but are not limited to: numerical ranges, thresholds (e.g., maximum data rate, minimum data rate, etc.), time specific values (e.g., count up, count down, etc.), specified values (e.g., "data", "audio", "video", "conference", etc.), and so forth.

For example, in the ad hoc mode of operation, the femtocell may be limited to a static minimal bandwidth (e.g., 1.4 MHz in LTE networks). In another example, during self-coordinated operation, the femtocell may have the full dynamic range of bandwidths (e.g., 1.4 MHz to 20 MHz in LTE). Such values are provided to such that a femtocell may either easily operate within its radio access network (such as by significantly limiting functionality), or flexibly operate within its radio access network (such as by providing a range of acceptable values from which the femtocell may autonomously select).

The aforementioned operational parameters may be actively assigned by the central network entity, may be determined by the femtocell independent of the central network entity, or a combination thereof. For example, in self-coordinated operation, the central network entity may provide one or more ranges of appropriate values. In contrast, in ad hoc operation, the femtocell may internally retrieve one or more default operational parameters. In another ad hoc implementation, the femtocell may identify one or more acceptable operational parameters by observing its immediate radio access network surroundings (i.e., without the assistance from its own core network). In yet another ad hoc implementation, the operational parameters may be set by the hosting party of the femtocell (e.g., via user interface or other input). Myriad other methods of identifying suitable operational parameters are readily recognized by those of ordinary skill within the arts given the present disclosure.

In one embodiment, the femtocell autonomously provides service to its subscribers based on the one or more identified operational parameters. Such autonomous administration may include analysis of one or more subscriber objectives (e.g., data rates, latency, throughput, etc.), and selecting an optimal value from one or more flexible parameters. For example, bandwidth size may be a flexible parameter having multiple possible values; e.g., 1.4 MHz to 20 MHz. The bandwidth size parameter may specify that only a subset of the possible values are allowed; e.g., 1.4 MHz to 10 MHz. The femtocell independently selects a value from within the flexible parameter range for subscriber usage.

Optionally, the femtocell may additionally continuously monitor its immediate radio surroundings to dynamically change its settings, or re-request operational parameters (step 508). For example, a femtocell which is operating in a standalone or self-coordinated mode may at a later point determine that it desires network coordination, or vice versa. In another example, if the quality of service of an established call between the HeNB 402 and one or more of its UEs 112 degrades, then the HeNB may autonomously reselect one or more parameters (such as frequency, and bandwidth), for correcting the degradation.

Such monitoring may include for example detection of activity changes to neighboring active macro cells and/or femtocells, changes to detected network load, statistics related to time of operation of neighboring cells, and/or changes to one or more characteristics of the detected spectrum, expected time of operation of the cell under consideration, changes to one or more capabilities of the femtocell, changes to operator account information, changes to the current location, femtocell ID, etc.

Exemplary LTE Home eNodeB (HeNB) Methods—

Figure 7:
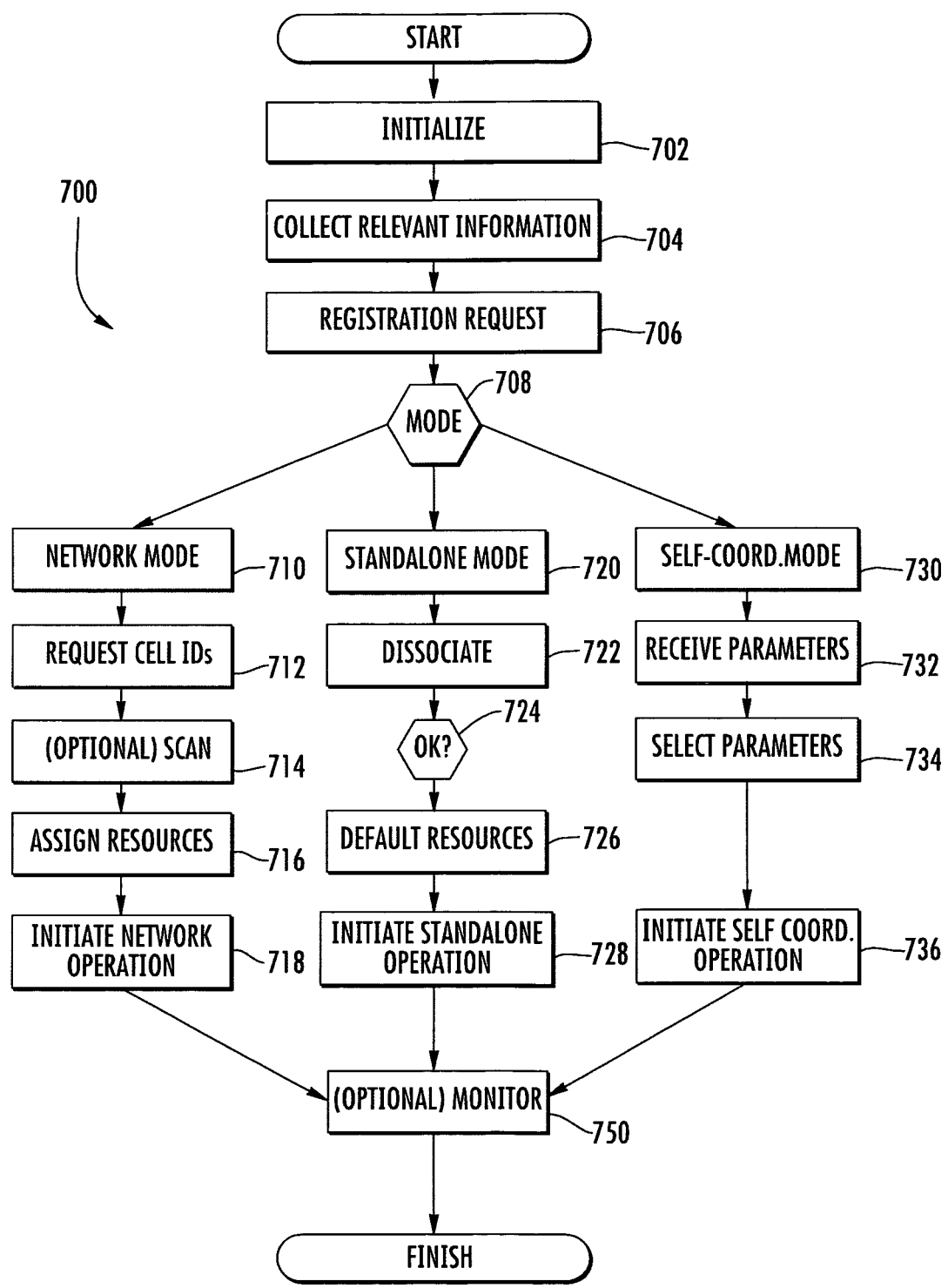
FIG. 7 is a logical flow diagram of one exemplary embodiment of a methodology for receiving and using an operational mode and operational parameters for a Home eNodeB, in accordance with the present invention.

FIG. 7 illustrates one exemplary operational mode selection process 700 for a HeNB 402 operating within an LTE Radio Access Network (RAN). In this embodiment, the EPC 104 may select the following configuration modes for HeNB operation: (1) network coordinated mode, (2) self-coordinated mode, and (3) ad hoc mode. It will be recognized, however, that more or less modes may be used consistent with the invention, the foregoing being merely illustrative of the broader principles. Moreover, each mode may have one or more "sub-modes" or options therein, which can be selected based on one or more selection criteria or considerations. For instance, in one variant, the appropriate sub-mode is selected according to a hierarchical selection logic which is based on the various parameters received or detected.

In the embodiment of FIG. 7, the HeNB (Home eNodeB) 402 provides a first set of radio measurements included in the registration request message to an EPC (Evolved Packet Core) 104 resident at the network operator. The measurements include one or more of: detected neighboring cell IDs, geographic location (such as GPS coordinates), nearby radio networks of other operators, etc. Furthermore, the HeNB may also provide its own IP address, capabilities information, usage statistics, etc.

Based on the received indicia, the EPC 104 accepts or denies the HeNB's registration request. If the EPC accepts the HeNB's request, the EPC additionally provides a designation of operational mode (e.g., "network coordinated", "self-coordinated", "ad hoc"), and one or more operational parameters. The operational parameters may include: a designation of and/or restrictions for one or more carrier frequencies to be used by the femtocell, a designation of and/or restrictions for one or more bandwidth sizes, time restrictions, and radio power restrictions, etc.

While the foregoing set of indices, parameters, and configuration modes are specific to LTE implementations, it is readily appreciated that any of the foregoing could be augmented, or obviated in other implementations or for use with other technologies.

At the first step 702, a HeNB 402 is first powered on, and internal settings within the femto cell are initialized. The initialization of internal settings may generally include booting the software, as well as any resetting of hardware settings within the femtocell itself. It is appreciated that in other embodiments, the initialization step 702 may be entirely unnecessary. For example, in some cases, the femtocell may already be initialized (e.g., such as during a periodic scan, a user-initiated refresh scan, etc.).

At step 704, the HeNB 402 collects relevant information for operational mode selection. In one exemplary embodiment, the HeNB performs a scan of the current radio resource utilization. The HeNB may scan only a subset of all resources (e.g., only the resources used by a preferred network operator, portion of a network, portion of the resource "space" such as a fraction of a frequency spectrum, a certain frequency range at a certain time instance with a certain spreading code, etc.), or may perform a full scan of all resources which may be used for HeNB operation.

In one implementation, the HeNB 402 identifies its neighboring cells. The HeNB executes a scan for cell IDs. In an LTE system, the Broadcast Control Channel (BCCH) is broadcast constantly from both HeNBs and eNBs 106. The BCCH is a unidirectional channel which carries information necessary for identifying and initiating a communication channel to the cell. The BCCH transmit power is constant, but environmental factors may affect signal reception (RF interference, geography, weather-induced or Rayleigh fading, etc.). Therefore, received signal strength (e.g., RSSI) of the BCCH can be used as a rough estimation of proximity. Parameters that are transmitted on the BCCH may include a listing of frequencies, cell ID, power control, and discontinuous transmission (DTX) information. Also, the Public Land Mobile Network identification (PLMN ID) to which that cell belongs is encapsulated in the system information transmitted on the BCCH. The PLMN ID is a concatenation of the Mobile Country Code (MCC) with the Mobile Network Code (MNC) and Location Area Identity (LAD, although it will be recognized that these protocols are merely exemplary in nature, and others may be used in conjunction with or in place of the foregoing, consistent with the invention.

Furthermore, in some embodiments, the HeNB may gather specific information regarding its current location. For example, the HeNB may demodulate a Global Positioning System (GPS) signal (or similar location based system).

At step 706, the HeNB 402 transmits a request for registration to the EPC 104 of the network operator. The HeNB establishes a network connection with the Core Network entity for initial authentication, authorization and accounting. This may comprise negotiating and establishing a connection over the access medium of choice; e.g., DSL over copper wire, fiber optic (e.g., FiOS), cable modem, etc. Upon establishing the network connection, the femtocell notifies the EPC of its presence, and optionally its operational status. In order to perform this step, one embodiment of the HeNB retrieves from a computer-readable media (e.g., HDD, ROM or flash memory) the address and protocol for connecting to the Core Network entity. In one variant, this includes use of a TCP/IP transport over the aforementioned access medium, although other transports and protocols may be used with equal success (e.g., over a WiMAX or even millimeter wave link).

In one exemplary embodiment, a security procedure is automatically executed for the HeNB 402 to securely connect to the Core Network. Some minimal requirements are imposed, comprising Internet Protocol (IP) security, authentication, and authorization. IP security must be established for bearer traffic to be carried over an unfrosted or public network such as the Internet. Authentication and registration with the Core Network ensure that the femtocell is a valid device, and not "spoofing" or otherwise attempting to trick the Core as to its identity. The femtocell must be authorized to provide service through the service provider. It will be appreciated that other security measures known to those of ordinary skill in the art may be employed as well, including e.g., encryption of all or a portion of the data being transmitted so as to protect data confidentiality, and cryptographic residue (hash) generation to provide integrity protection.

In one exemplary embodiment, the collected relevant information is additionally included with the registration request message. In an alternate embodiment, the relevant information may be transmitted to the EPC 104 as a process distinct from registration (e.g., via another extant or dedicated messaging protocol). In yet another embodiment, the information may be stored for later retrieval (e.g., the EPC requests the relevant information from the HeNB 402 for periodic network optimization).

In alternate embodiments, the collected relevant information may be evaluated prior to issuing the registration request. For example, the HeNB 402 may include logic (e.g., a computer program or algorithm) to evaluate current network conditions to preemptively determine if it should register as an ad hoc, self-coordinated, or network coordinated femtocell. This determination (or recommendation) may be passed up to the EPC if desired. In some implementations of ad hoc operation (e.g., Wi-Fi hotspot, etc.), the HeNB does not register with the (a) core network at all.

The exemplary registration request message also may include a listing of the cell IDs of neighboring cells (e.g., eNBs 106, and or HeNBs 402), identified in step 704. In another embodiment, to maintain compatibility with other systems, the registration request message may be separated into multiple separate messages; e.g., one for a resource request, and another message detailing the list of cell IDs detected. Yet other protocols may be used as well consistent with the invention.

At step 708, the EPC 104 determines the appropriate mode for the HeNB 402, and optionally provides one or more operational limitations. In one embodiment, the EPC designates a mode selected from the aforementioned three (3) available modes; i.e., a network-coordinated mode (starting at step 710), a standalone or ad hoc mode (starting at step 720), and a self-coordinated mode (starting at step 730). These modes are now each described in greater detail.

Network Coordinated Operation

In one exemplary implementation, if the EPC 104 designates network-coordinated operation (step 710), then at step 712, the EPC requires definitive identification of the HeNB's neighboring cells. In one embodiment, the HeNB 402 is commanded to execute a scan for neighboring eNBs 106 if it has not already done so (step 714). Once the HeNB has identified its neighboring cells and provided the information to the EPC, the EPC can determine resource allocation information by coordinating with each of the neighboring cells to optimize overall network operation. For example, the EPC may identify an unused and available portion of the RF spectrum for the HeNB, and allocate it accordingly. Alternatively, the EPC may require any number or combination of the HeNB, the neighboring HeNBs, and/or eNBs to adjust operation to free resources or achieve other operational goals or constraints.

At step 716, the EPC 104 assigns resources for the HeNB 402 (and potentially also one or more of the identified neighboring cells). At step 718, the community of cells resumes operation with the benefit of the EPC allocations. In some embodiments, the EPC may continue to monitor (step 750), or receive notifications of the cell neighborhood operation. In other embodiments, the EPC may dissociate itself from further cell neighborhood operations.

Standalone or Ad Hoc Operation—

If the EPC 104 designates standalone operation (step 720), then at step 722, the EPC dissociates itself from the HeNB 402, and the HeNB presumes that it may operate in standalone mode; i.e., that it must operate autonomously, in isolation from other network management entities.

At step 724, the HeNB 402 determines if it may operate at all. Due to restrictions imposed by, e.g., regulatory bodies, the HeNB may be prohibited from operation for a wide variety of reasons, including: a lack of available resources (spectrum, etc.), geographic limitations, and restrictions imposed by nearby network operators, etc. If the HeNB is not precluded from operating, then the HeNB retrieves default settings for operation (step 726). Such default settings may be preset within the HeNB, or may be messaged to the HeNB from the EPC 104 or another entity. In certain embodiments, the HeNB may receive default settings from another nearby entity, such as an eNB 106 of a visited network. In such "roaming" operation, the HeNB may obtain appropriate default settings from the visited network. In yet other embodiments, the HeNB may query the hosting party for appropriate operational parameters, or obtain them via a server (e.g., web site via broadband connection).

At step 728, the HeNB 402 commences standalone operation. During standalone operation, the HeNB provisions service within its default settings (e.g., a carrier frequency, a frequency bandwidth, a transmit power, etc.). While the HeNB generally will not seek to change its operational parameters, it may be forced to dynamically modify them due to changing environmental conditions. In one embodiment of the method 700, the HeNB attempts to provision at least a minimal level of service such that the level of service may remain relatively stable. Generally speaking, smaller sections of spectrum can be easily found, and switched between without too much trouble or risk of interference. In alternate embodiments, the HeNB may seek out larger sections of spectrum to offer better service, however it is appreciated that this may also reduce the perceived robustness of service, in that larger contiguous sections of spectrum are more prone to interference from other HeNBs, or other sources such as fixed emitters.

Optionally, at step 750, the HeNB 402 additionally monitors its performance to dynamically change its settings, or re-request operational modes or parameters via a new connection to the EPC 104.

Self-Coordinated Operation

In the self-coordinated mode (step 730), if the EPC 104 designates self-coordinated operation, then at step 732, the EPC provides operational parameters to the HeNB 402, and the HeNB is allowed to autonomously moderate its behavior. Unlike standalone operation which is completely autonomous, self-coordinated operation maintains a connection to the EPC, so as to receive updated network management instructions or other useful data if necessary, and also optionally permit the HeNB to transmit information back to the EPC. Self-coordinated operation reduces the EPC's overall network management burden, while still providing considerable control over network operations.

The EPC 104 may provide operational parameters which are flexible or single value settings, as previously described herein. Accordingly, at step 734 of the illustrated embodiment, the HeNB 402 internally determines its appropriate requirements for operation. Such a determination may include the analysis of one or more subscriber objectives (e.g., data rates, latency, throughput, etc.), nearby environmental concerns, internal capabilities, etc. For example, if the EPC designates a range of available carrier ranges (f1, f3, f4) with corresponding bandwidths (1.4 MHz, 5 MHz, 10 MHz), the HeNB may independently scan each of the ranges, and identify its preferred carrier based on current network conditions (e.g., crowding), and expected use.

At step 736, the HeNB 402 commences self-coordinated operation using its preferred operational parameters determined in step 734. In one exemplary embodiment, operational parameters are given expiration dates/times. Expiration of an operational parameter triggers the HeNB to re-request an update from the EPC 104. Other criteria may be used to trigger expiration as well, including for example a counter (e.g., certain number of events occurring irrespective of time frame, the occurrence of a single event, and so forth).

Optionally, at step 750, the HeNB 402 additionally also monitors its performance to dynamically change its settings, or re-request operational modes or parameters via its existing connection to the EPC 104.

Exemplary LTE Evolved Packet Core (EPC) Methods—

Figure 8:
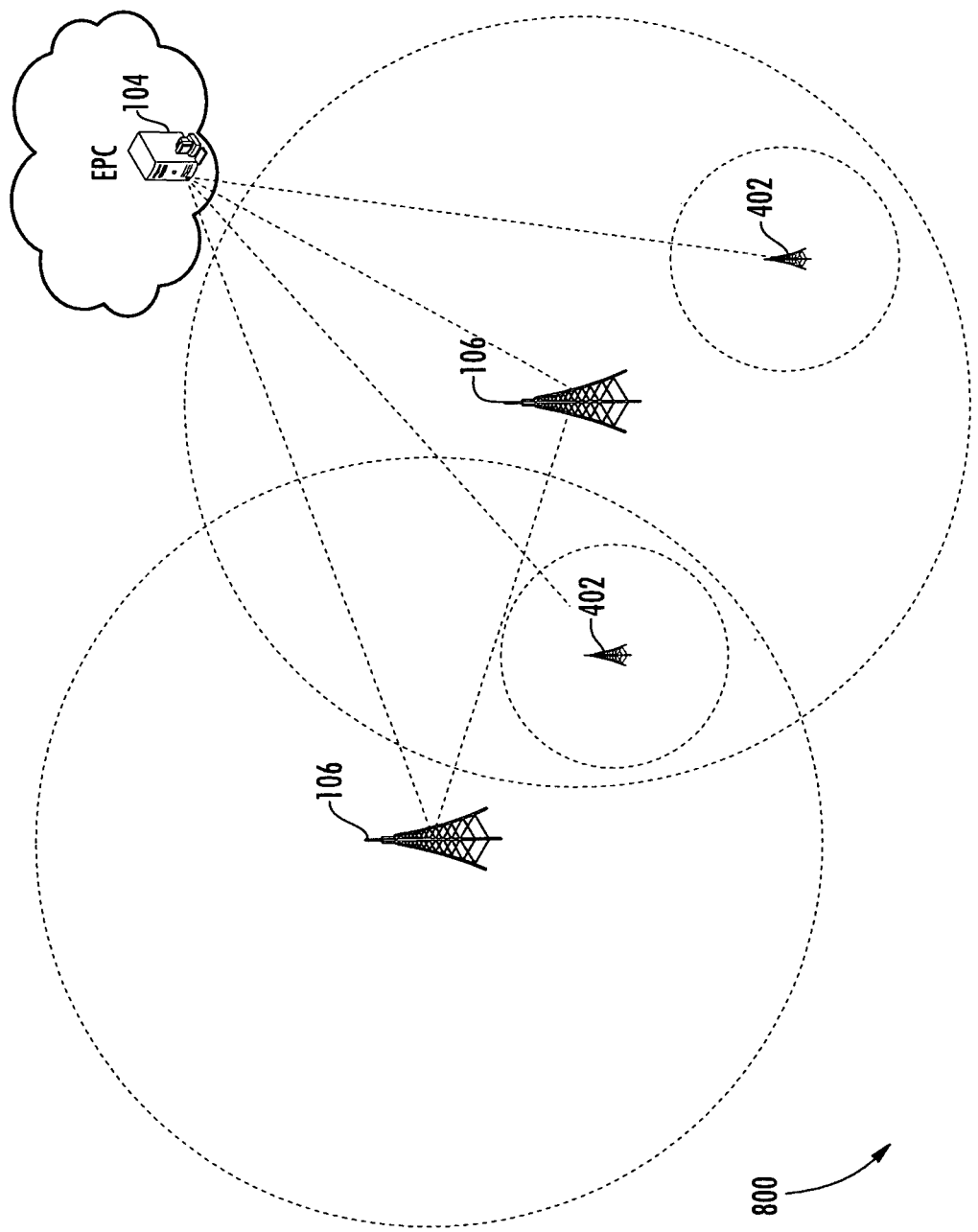
FIG. 8 is a graphical illustration of one embodiment of an LTE Radio Access Network according to the invention, the network including an Evolved Packet Core (EPC), eNodeBs, and Home eNodeBs.

Referring now to FIG. 8, one embodiment of an LTE network 800 configured according to the invention is illustrated, the network having an EPC 104 for managing spectral resources of the network as previously described herein. The network of FIG. 8 includes a first central decision-making EPC 104 which is directly controlled by the network operator (or its proxy). The illustrated system also includes many HeNBs 402 and eNBs 106 of the LTE RAN.

In one embodiment, the central EPC 104 controls access rights for a large number of HeNBs 402; e.g., the majority of the HeNBs for a'network operator within a city, zone, or country. In one such embodiment, the centralized EPC has overriding authority to resolve any contradictory resource allocations.

At least a portion of the HeNBs 402 shown in the exemplary network operates with varying degrees of autonomy. Standalone HeNBs are fully autonomous, and do not require any input from the network operator to function. Self-coordinated HeNBs are semi-autonomous, and require limited input from the network operator throughout operation. Network coordinated HeNBs are fully coupled to the EPC 104, and require significant supervision. Hence, the present invention contemplates networks ranging from those which are completely homogeneous (i.e., one type only of one of the foregoing categories), to those which are heterogeneous (mixes of two or more of the foregoing).

Figure 9:
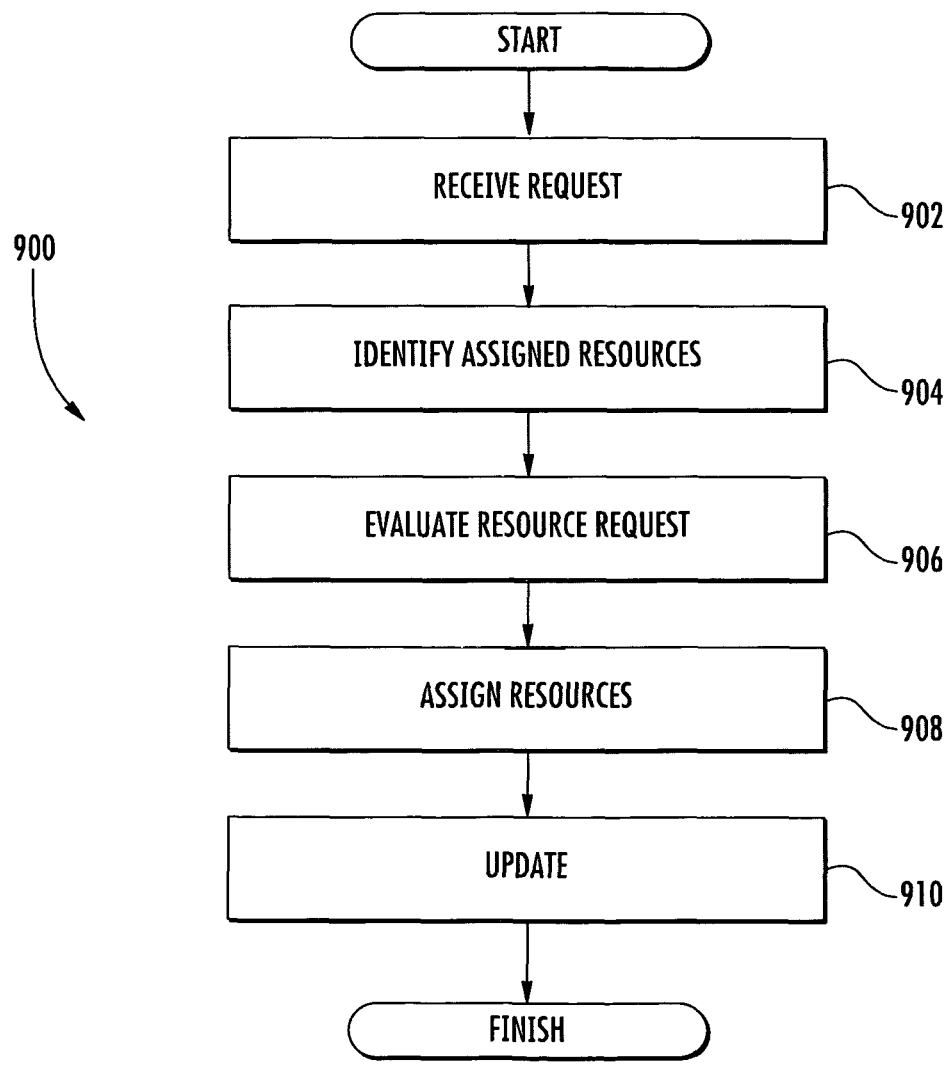
FIG. 9 is a logical flow diagram of one exemplary embodiment of a methodology for determining and assigning an operational mode and operational parameters at an EPC, in accordance with the present invention.

Referring now to FIG. 9, one embodiment of a generalized method of operation 900 of the EPC architecture previously described with respect to FIG. 8 is now discussed in greater detail.

At step 902, the EPC 104 receives a request from a newly arriving HeNB 402. In one exemplary embodiment, the request includes a registration request, including the listing of nearby cell IDs as detected by the HeNB. The listing of decoded Cell IDs is separated into two groups: (i) Cell IDs of eNBs, and (ii) Cell IDs of HeNBs. The Cell IDs of macrocells are assumed to be a permanent fixture of the requesting HeNB's environment, and will not change. The Cell IDs of neighboring HeNBs are assumed to be temporary fixtures of the HeNB's environment, and may change nomadically, erratically, periodically, or not at all.

At step 904, the EPC 104 identifies the previously allocated resources based on the indicated Cell IDs. In one exemplary embodiment, the EPC retains a current listing of the spectral footprint of each eNB 106 and at least a portion of the HeNBs 402. As used herein, the "footprint" of a cell is the mapping of spectral resources consumed by the cell. An aggregation of footprints of the neighboring cells indicates the portion of the total resources already consumed by the HeNBs immediate radio surroundings. The EPC may, for example, identify that at least one resource is definitely available (e.g., one or more spectral resources is unused), one or more resources may potentially be available (e.g., all resources are occupied, but one or more is open for negotiation, etc.), or no information is available (e.g., the HeNB is roaming, etc.)

At step 906, the EPC 104 evaluates the radio resources for configuration or reconfiguration. In one embodiment, several criteria for radio resource selection may be evaluated by the network operator. Such criteria may include for example maximizing or minimizing data rates, bandwidth consumption, supporting varying levels of quality of service (QoS) for various HeNBs 402, maintaining certain security requirements, maximizing revenue or profit, etc. Additionally, such criteria may depend on the contract between the HeNB operator/owner and the operator of the cellular network. For example, a HeNB with a low-budget tariff (e.g., residential) obtains a smaller bandwidth compared to a HeNB with a business tariff for, e.g., an office building. In one implementation, a limited data pipe shared between eNBs 106 and HeNBs in a region may be preferentially served to eNBs, therefore HeNBs may be assigned resources to support high data rates only during periods of otherwise low network usage.

In another example, the EPC 104 may determine that a particular eNB 106 may have too many HeNBs 402 in its vicinity, and the EPC may opt to deny service to additional HeNBs which request a frequency in that eNB's general vicinity.

In yet another example, the EPC 104 may determine that one or more of the neighboring HeNBs 402 could be reconfigured to make space for the new HeNB. The EPC may either transmit new operational parameters to the HeNBs, or reset one or more of the neighboring HeNB's modes (e.g., changing a self-coordinated HeNB to a network coordinated HeNB).

In still another example, the EPC 104 may determine that none of the nearby cells to the requesting HeNB are in its control, and thus the HeNB 402 is roaming. The EPC may immediately configure the HeNB for standalone or ad hoc operation.

In yet a further example, the EPC 104 may identify a range of parameters which are potentially open for use. For example, the EPC may have previously reserved a range of resources for a first self-coordinated HeNB 402. The EPC may not definitively know which resources are occupied by the first self-coordinated HeNB, but it may be reasonably confident (based on predetermined parameters or algorithms) that the resources could reasonably sustain both the first and second HeNBs.

At step 908 of the method 900, the EPC 104 generates a response to the HeNB 402. In one embodiment, this response includes a mode assignment, and one or more operational parameters. For example, the EPC may respond with an assignment for the HeNB to operate in network coordination mode, and a set of operational parameters. In another example, the HeNB may be assigned to operate in standalone operation; the EPC may optionally provide default parameters, or these defaults may be resident on the HeNB, or even obtained from a third party, as previously described. In yet another example, the HeNB may be assigned to self-coordinated operation, with one or more operational parameters.

In one embodiment of the invention, the aforementioned operational parameters describe a range of allowable parameters, whether discrete (e.g., only certain prescribed values, such as {1.4 MHz, 5 MHz, 10 MHz . . . }), continuous (1.4 MHz to 50 MHz, and any values inbetween), or even fuzzy ("low", "medium", or "high") in nature. Responsive to selecting an operational parameter from a range, the HeNB 402 returns a message indicating its selected parameter (e.g., the selected carrier frequency, etc.). Such a response may also be used for future network planning, and could be considered a "definite" footprint. In an alternate variant, the HeNB does not provide a response indicating the selected parameters, and the EPC 104 maintains a "soft" footprint (i.e., one definitely present, but subject to change based on operational parameters). In another embodiment, the operational parameters may include direct assignments for the recipient HeNB (e.g., also a "definite" footprint).

In some cases, the EPC 104 may opt to asymmetrically assign resources to preferentially serve one HeNB 402 over another, such as may be useful for achieving business goals or revenue/profit optimization. The need for such asymmetric assignment may also be deduced by the EPC based on observed data or information provided by the various HeNBs. For instance, where two HeNBs are both operational for the same duration, but one characteristically or historically carries much lighter loading than the other, the more heavily loaded HeNB can be assigned more resources in a speculative fashion, on the assumption that past patterns of use will continue during future periods. Such allocations can be dynamically changed if the speculation is inaccurate; e.g., loading on the "low-loaded" HeNB rapidly increases in a sustained fashion.

At step 910, the EPC 104 updates its internal table or other data structure with the new HeNB Cell ID, and its configuration information. In some cases, the EPC may also update other affected cells. For a HeNB 402 which was denied service, the EPC may opt not to record its entry. The EPC may also record the denied HeNB along with a time stamp, or number indicating number of denials (for use in algorithms ensuring fair HeNB service or identifying hardware or software malfunctions or "bugs"). The EPC may also record the denied HeNB and any neighboring HeNB cell IDs, such that when a neighboring HeNB is powered down, the denied HeNB may be offered service.

In one variant, multiple degrees of configuration information may be used. For example, spectral resources could be "definite" in assignation, or "soft" in assignation. A "soft" assignation could be overloaded with HeNBs 402, whereas a "definite" assignation requires signaling overhead with the EPC 104 to be reassigned. Multiple HeNBs having a soft assignation could collide; however, negotiation and or compensation mechanisms between the conflicted HeNBs may resolve most conflicts without additional intervention by the EPC.

Femtocell Apparatus—

Figure 10:
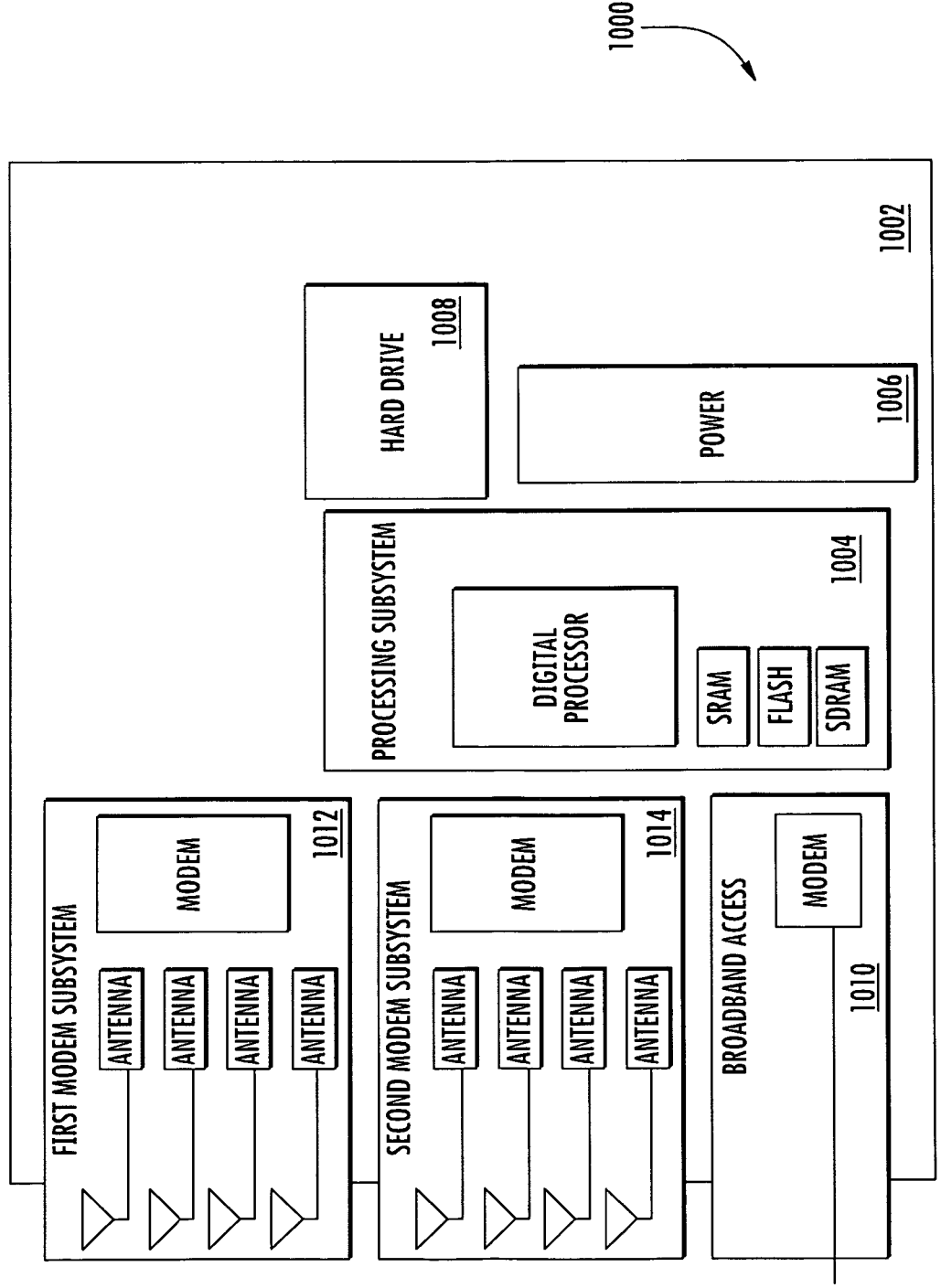
FIG. 10 is a block diagram of one embodiment of a femtocell apparatus configured in accordance with the present invention.

Referring now to FIG. 10, exemplary femtocell apparatus 1000 useful in implementing the functionality previously described above is illustrated and described. The femtocell apparatus 1000 of the illustrated embodiment generally takes the form factor of a stand-alone device for use in a premises, although other form-factors (e.g., server "blades" or cards, dongles, roof-mounted units, etc.) are envisaged as well. The apparatus of FIG. 10 includes one or more substrate(s) 1002 that further include a plurality of integrated circuits including a processing subsystem 1004 such as a digital signal processor (DSP), microprocessor, PLD or gate array, or plurality of processing components, RF transceiver(s), as well as a power management subsystem 1006 that provides power to the femtocell 1000.

The processing subsystem 1004 includes in one embodiment an internal cache memory, or a plurality of processors (or a multi-core processor). The processing subsystem 1004 is preferably connected to a non-volatile memory 1008 such as a hard disk drive (HDD), as well as a memory subsystem which may comprise SRAM, Flash, SDRAM, etc. The memory subsystem may implement one or a more of DMA type hardware, so as to facilitate rapid data access.

The exemplary apparatus 1000 will, in some embodiments, implement some form of broadband access. In the illustrated embodiment, the broadband access is provided by a DSL connection (i.e., via DSL subsystem 1010), although other interfaces, whether wired or wireless, may be used in place of or in combination with the DSL subsystem 1010 shown. The digital portion of DSL processing may either be performed in the processor 1004, or alternatively in a separate DSL processor (not shown). Further, while a DSL broadband connection is illustrated, it is recognized by one of ordinary skill that other broadband access schemes such as DOCSIS cable modem, T1 line, WiMAX (i.e., IEEE Std. 802.16), ISDN, FiOS, microwave link, satellite link, etc. could be readily substituted or even used in tandem with the aforementioned DSL interface. DSL has the advantage of being low cost and generally ubiquitous, and carried over copper-based telephony infrastructure which is currently widely distributed throughout the population.

In one exemplary embodiment, the femtocell apparatus 1000 includes two RF modem subsystems. The first wireless subsystem 1012 enables the femtocell to search neighboring cell RF transmissions (e.g., macrocell, or femtocell). The second modem subsystem 1014 enables the femtocell to provide service to subscriber UE. It is readily appreciated that in some embodiments of the invention, two subsystems are not required. For example, a femtocell apparatus which only performs standalone, or network-based configuration, would not require the first wireless subsystem 1012. Furthermore, it is appreciated that in some embodiments, a femtocell may provide multiple RF modem subsystems to provide, inter alia, multi-mode operation (e.g. GSM, GPRS, UMTS, and LTE) over multiple distinct air interfaces.

The first modem subsystem 1012 includes a digital modem, RF frontend, and one or more antennas. In some embodiments, it may be desirable to obviate some of the components presently illustrated (such as RF frontend), or alternatively, the discrete components illustrated may be merged with one another to form a single component. In one exemplary implementation, the first wireless subsystem 1012 operates as a standard LTE UE modem.

The second modem subsystem 1014 includes a digital modem, RF frontend, and one or more antennas. Again, in some embodiments, it may be desirable to obviate some of the components presently illustrated (such as RF frontend), or alternatively, the discrete components illustrated may be merged with one another to form a single component. While a single RF frontend is illustrated between the exemplary femtocell apparatus 1000 and a UE 112, it is appreciated that multiple RF front ends may exist to support multiple simultaneous UEs and air interfaces, or alternatively implement MIMO aspects of operation.

The femtocell apparatus 1000 of FIG. 10 further includes apparatus for scanning for Cell IDs broadcasted in occupied radio resources. Accordingly, the apparatus responsible for scanning radio resources must receive the radio frequency signal and at least partially demodulate neighboring cell messages (e.g., those sent on the broadcast control channel (BCCH)). The femtocell may be configured to fully demodulate the downlink power signal from the cellular network. Alternatively, for a wireless system which does not require full demodulation to extract the Cell ID, the signals can be demodulated only as far as is required to extract the received Cell ID.

In some wireless networks, pre-configuration data is required in order to complete the demodulation process. In one such exemplary embodiment, this demodulation data is referenced to location identification. For instance, the femtocell can obtain an ID of the country in which the scanned mobile communication system is running (e.g., the mobile country code or MCC) via the wireless interface. Alternatively, the femtocell can select a set of parameters from a stored table or a hard-coded set of parameters. As yet another alternative, the femtocell may actively query its location from an external entity (e.g. a network provider, website, third party server, etc.) via the broadband subsystem.

The femtocell should also be able to seamlessly operate with an EPC 104 resident at the network operator. In one such embodiment, the femtocell and EPC are connected via a broadband type access network (wired or wireless). In another embodiment, the femtocell and EPC are connected via a first or second radio modem subsystem (e.g., cellular interface).

Evolved Packet Core (EPC) Apparatus—

Implementation of the EPC 104 may be accomplished in hardware and/or software. In the exemplary embodiment described subsequently herein, the EPC entity is implemented within software embodied in a computer readable medium (e.g., HDD, memory, etc.) and executable by a processing device (e.g. a digital processor/DSP, microprocessor, etc.), although this is not a requirement of practicing the invention.

The EPC 104 manages and/or stores a table of spectral resources, and their use with respect to a group of one or more cells (e.g., femtocells, and/or macrocells). Such a database should relate cell IDs to one or more resources. Additionally, such a database can provide the current operational mode for each cell. For example, during the initialization of an HeNB 402, the EPC will receive a listing of cell IDs, tabulate the consumed spectral resources, and allocate one or more spectral resources to the new HeNB based on the unused (or relatively unused) portions of spectrum.

While the present embodiment suggests the storage of data local to the EPC function, it is appreciated that remote storage of the data may be utilized as well. For example, a network operator EPC 104 may maintain entries for a large number of femtocells. The size of such a database would typically be handled at a remote storage facility, but this is not a requirement, and in fact the data may be distributed across two or more storage entities if desired, whether local or remote.

Furthermore, it is understood that multiple methods for obtaining currently used resources may be utilized. These methods may include for example periodic or event-driven refresh and reclamation procedures. Reclamation of valuable spectrum may be critical for nomadic femtocell operation, especially where the previously assigned femtocell may experience unexpected or "dirty" power off sequencing (i.e., when there is no affirmative relinquishment of allocated resources back to the network). During normal operation, the network operator does not constantly monitor each femtocell. Thus, if a femtocell is powered off unexpectedly (e.g., by unplugging it, instead of using a shutdown command), the network operator will still believe the femtocell is operational. Thus, in one embodiment, a femtocell may initiate a reclamation procedure to reclaim poorly vacated resources.

During operation, an EPC 104 assigns spectral resources to requesting femtocells, based on information from the received resource request (e.g., a requested bandwidth). While in an exemplary embodiment the primary input for resource allocation is from the femtocell, it is appreciated that other inputs may be necessary and further may override the femtocell resource request. In certain circumstances, the EPC may determine that the femtocell resource request is to be ignored, and no such resource is allocated to the femtocell. Such a circumstance may occur due to network burden, business accounting (e.g., non-payment of a monthly bill), improper/unsupported hardware, security, higher priority femtocells "trumping" the requesting cell, etc. Furthermore, it is appreciated that the resource pool selected from by the EPC may not be a comprehensive pool of resources (such limitations may be imposed for hardware/software compatibility issues, security issues, business issues etc.).

Example Scenarios

Figure 11:
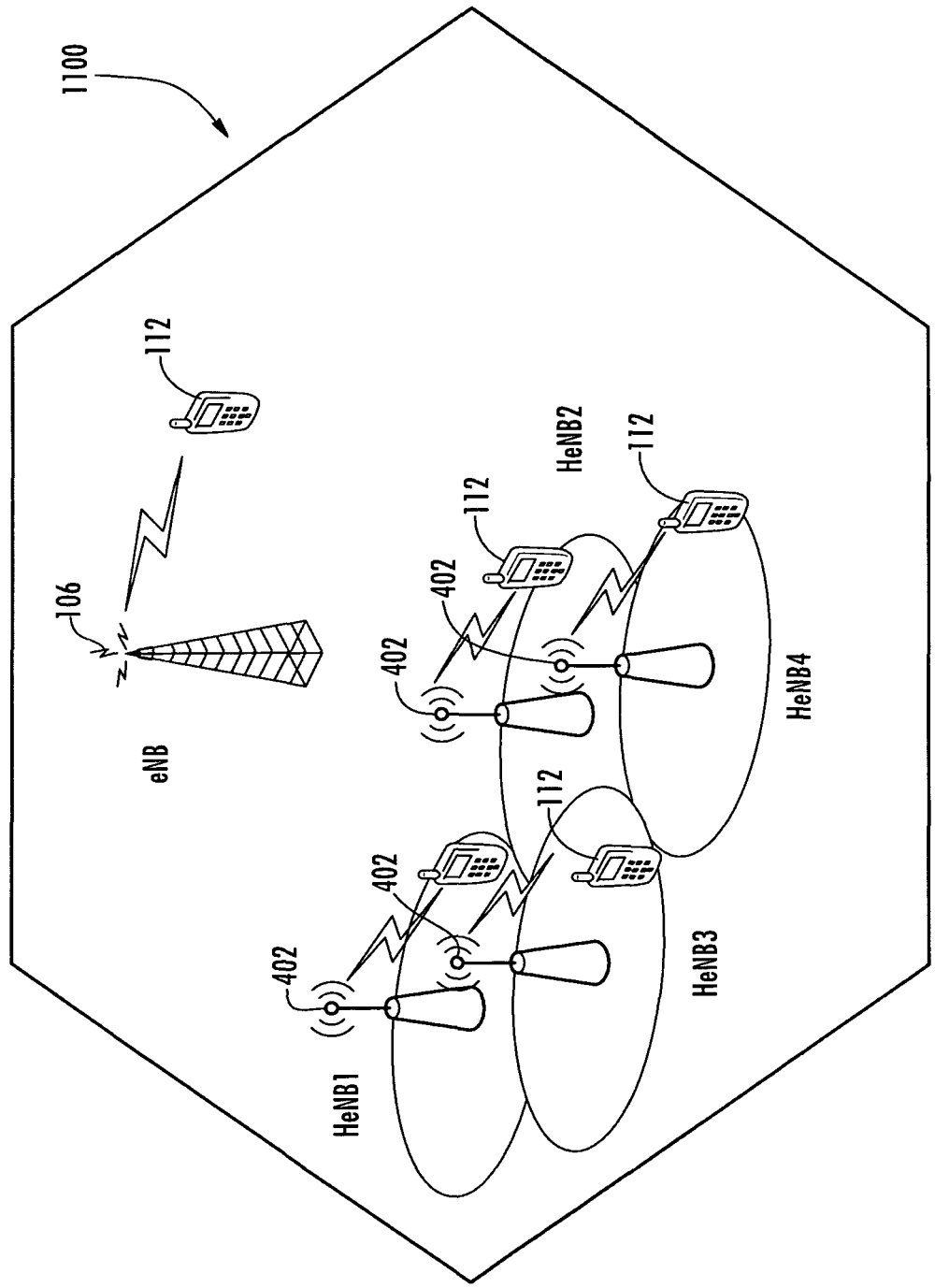
FIG. 11 is a graphical illustration showing one exemplary deployment of four (4) LTE HeNBs.

Referring now to FIG. 11, the following deployment scenario 1100 is provided to illustrate one or more aspects of the present invention. The macrocell coverage is provided by an LTE-Advanced eNB 106. Four Home eNodeBs (HeNB1, HeNB2, HeNB3, and HeNB4) 402 are currently located in the eNB's coverage area 108, and concurrently provide service to subscriber UEs 112. The eNB is operating with carrier frequencies f2 and f4, whereas the HeNBs are operating in carrier frequencies f1 and f3.

Figure 12:
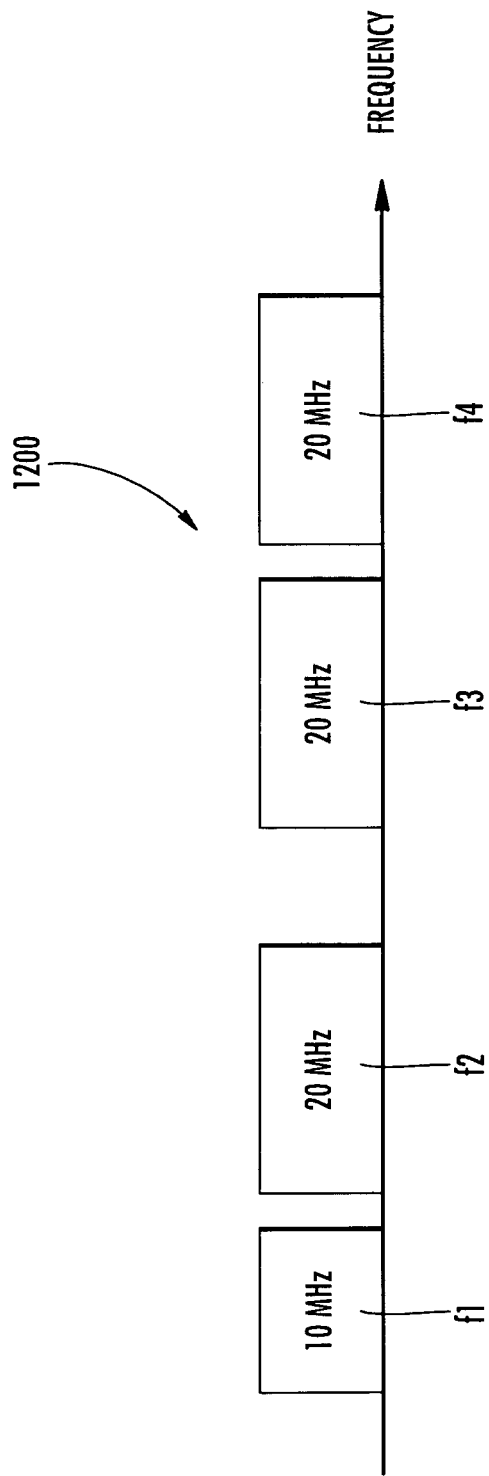
FIG. 12 is a graphical illustration showing an exemplary fragmentation of spectral resources, providing both uplink and downlink in non-contiguous spectrum.

FIG. 12 additionally indicates the LTE-Advanced system spectral resource allocations 1200. The overall uplink channels comprise two non-adjacent frequency bands f1, and f2 which jointly provide 30 MHz of bandwidth. The downlink channels comprise two non-adjacent frequency bands f3 and f4 which jointly provide 40 MHz of bandwidth.

A femtocell operator wants to operate his HeNB 402 located in a hotel room where coverage is also provided by the macro cell. Upon switch-on and initialization HeNB sends a Registration Request message to the EPC 104 via DSL connection. The message contains the HeNBs currently detected location information (detected macro cell identity, geographical coordinates via use of GPS, IP address) and the identity of the HeNB. The EPC uses the information from the Registration Request message to perform access control of the HeNB. The registration attempt is accepted by EPC, and the HeNB receives a Registration Accept message.

First Scenario (Low Usage)—

In a first exemplary scenario, the EPC 104 identifies that there are a low number of active HeNBs 402 in its immediate vicinity of the new HeNB, the nearby network load is relatively low, and according to internal statistics the new HeNB usually operates less than an hour. Furthermore, the EPC has identified that the neighboring femtocells (i.e., HeNB1 to HeNB4) are operating in self-coordinated mode, and the carrier frequencies f1 and f3 are already shared with other operators. After the EPC evaluates each of the aforementioned data, it decides to minimize its processing efforts, and allow the new HeNB to govern itself in self-coordinated operation.

The EPC 104 accepts the new HeNBs 402 registration, and transmits operational parameters comprising: a self-coordination mode flag, a designation of carrier frequencies and bandwidths (i.e., f1 at 10 MHz, and/or f3 at 20 MHz), allowed spectrum (i.e., "ALL"), allowed bandwidths (i.e., 1.4 MHz, 3 MHz, 5 MHz), a maximum allowed time of operation (i.e., 1 hr), and a maximum allowed transmit power (i.e., 24 dBm).

Once the HeNB 402 receives the registration acceptance, the new HeNB autonomously selects appropriate settings for its operation. Sometimes the HeNB may accidentally select a physical resource that overlaps (fully or partially) with the frequency part used by another HeNB (e.g. HeNB1).

If the first and new HeNBs 402 are sufficiently isolated from one another (i.e., due to their distance and maximum allowed transmit power), then both HeNBs continue operation oblivious to the presence of the other. However, if the quality of service of established calls for the corresponding HeNBs degrades below a threshold level (or other criteria are met, such as detected RSSI at one or both of the HeNBs for the frequency bands of interest), then both HeNBs decrease their bandwidth; e.g., from 5 MHz to 3 MHz. If performance continues to suffer for both HeNBs, then they will autonomously reselect carrier frequencies and bandwidths for operation. This reselection may be according to a prescribed order or hierarchy, randomly, or even based on a carrier-sense/collision detection type of approach.

Second Scenario (Roaming HeNB)—

Referring again to the network of FIGS. 11 and 12, in a second exemplary scenario, the EPC 104 determines that both HeNB1 and HeNB2 are operated in network coordinated operation and are permanently in use, whereas HeNB3 and HeNB4 are operated in self-coordinated mode. Furthermore, the network load is operating at a moderate or medium load. The new HeNB 402 is identified as a "foreign" HeNB; i.e., it is subscribed and registered in a network of a different operator. According to statistics the average time of operation of each of the HeNBs is less than an hour. Finally, similar to the first scenario, the allocated spectrum characterized by the carrier frequencies f1 and f3 is shared with other operators (e.g., cell border).

Accordingly, the EPC 104 prefers to minimize the interaction with the new HeNB 402, and sets the new HeNB to self-coordinated operation. The EPC accepts the new HeNBs registration, and transmits operational parameters. However, unlike the first scenario above, the EPC further sets a series of operational restrictions which enable the new HeNB to operate without adversely affecting other existing cells.

Figure 13:
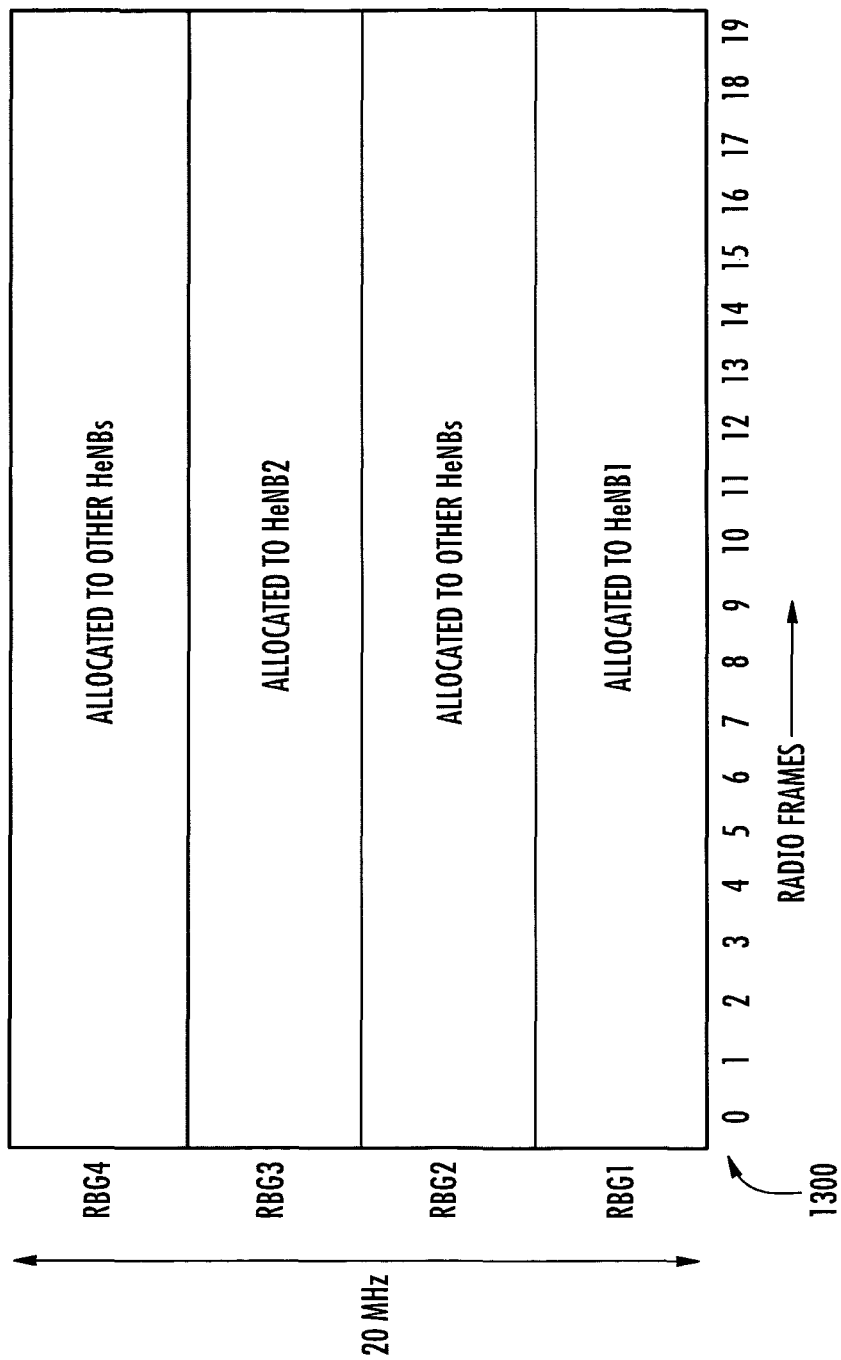
FIG. 13 is a graphical illustration showing an exemplary aggregation of downlink spectral resources, which are further segmented into four (4) resource block groups, useful with the present invention.
Figure 14:
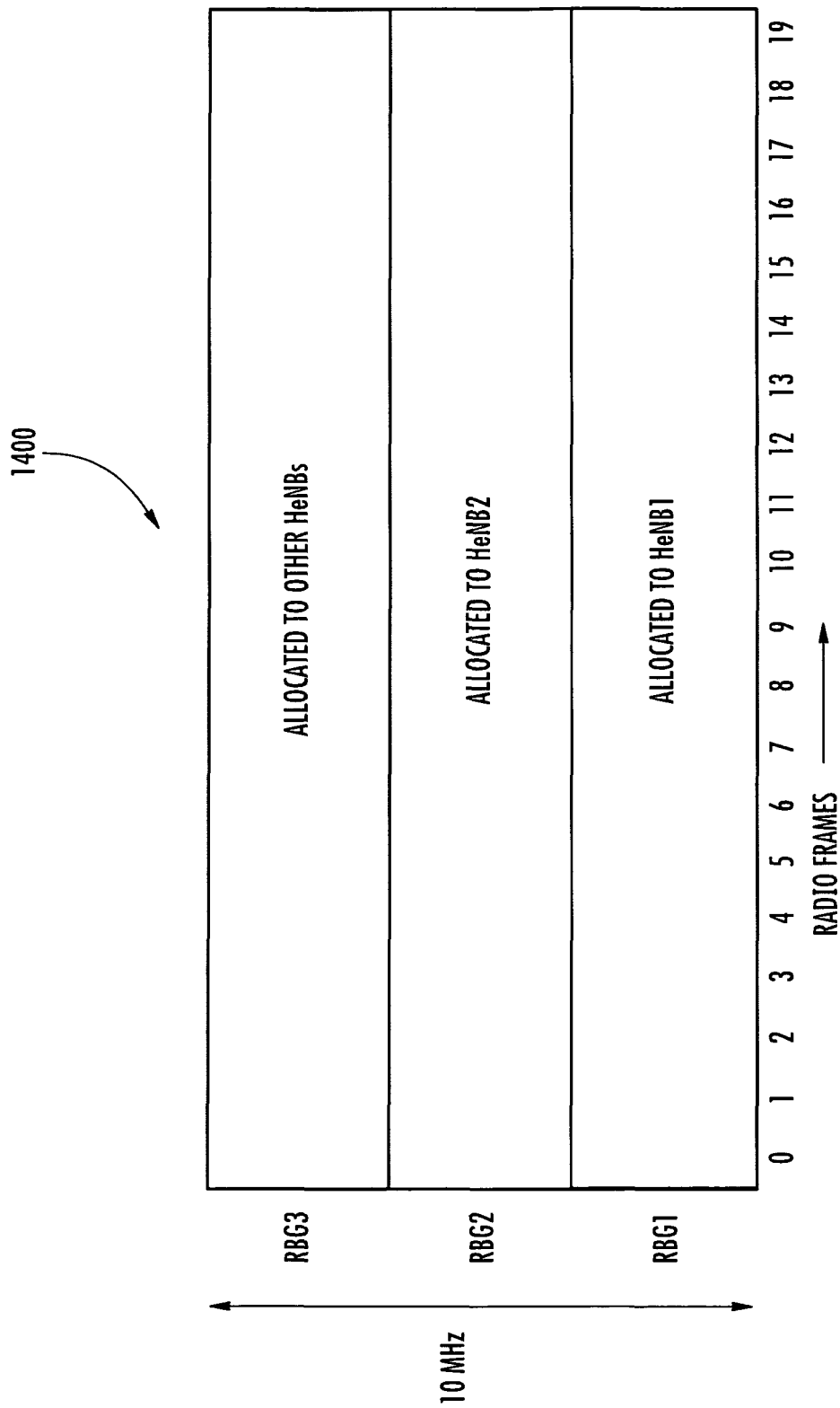
FIG. 14 is a graphical illustration showing an exemplary aggregation of uplink spectral resources, which are further segmented into three (3) resource block groups, useful with the present invention.

Referring now to FIGS. 13 and 14, the spectrum allocations for HeNB 1 and 2 are shown in both downlink (see FIG. 13) and uplink (see FIG. 14) directions. In the downlink direction 1300, the 20 MHz spectrum is divided in four Resource Block Groups (RBGs) of 5 MHz apiece, where RBG1 and RGB3 are allocated to HeNB1 and HeNB2 respectively. Similarly, in the uplink direction 1400, the 10 MHz spectrum is divided into three RBGs of 3 MHz apiece. RGB1 and RGB2 are allocated to HeNB1 and HeNB2 respectively.

As in the first scenario, the HeNB 402 is signaled with a self-coordination mode flag, a designation of carrier frequencies and bandwidths (i.e., f1 at 10 MHz, and/or f3 at 20 MHz). Furthermore, the HeNB is limited to operation within RBG 2 and RBG 4 for downlink reception, and RBG 3 for uplink transmission. The bandwidth sizes that the HeNB is allowed to use within the signaled frequency spectrum are limited to 1.4 MHz, 3 MHz, and 5 MHz. The HeNB is also limited to operation of no more than an hour, and a maximum transmit power of 20 dBm.

Once the HeNB 402 receives these parameters, the HeNB autonomously selects appropriate settings for its operation. Similar to the first scenario, the HeNB will autonomously monitor isolation from its neighboring cells. If performance suffers, then the new HeNB will autonomously reselect carrier frequencies and bandwidths for operation.

Business Methods and Rules Engine—

It will be recognized that the foregoing network apparatus and methodologies may be readily adapted to various business models. For example, in one such model, a service provider/network operator may provide an enhanced-capability femtocell (such as that described previously herein) to customers willing to pay a premium, or as an incentive for its higher-tier customers.

In another paradigm, certain strategic users could be selected to receive such enhanced-capability femtocells based on, inter alia, their subscription level, rate of usage, geographic location, etc., or even in exchange for consideration from the network operator (e.g., a rebate or reduction of their monthly service fees if they operate the femtocell in accordance with the network provider policies).

The aforementioned network apparatus and methodologies may also be readily adapted for operation in accordance with an underlying business rules "engine". This business rules engine may comprise for example a software application and/or hardware, and is implemented in one embodiment as a separate entity at the Core Network, or alternatively within an existing entity residing at the Core Network or other network management process (including the EPC(s)). In one embodiment, the business rules engine takes into account the revenue and/or profit implications associated with providing resources to one or more user-operated femto cells so that the resource allocation to the femtocell does not negatively impact network user experience (e.g., slowing downloads, latency in call or session setup, etc.), or the services that are able to be provided to users on the network via the geographically fixed base stations. Accordingly, the exemplary business rules engine can modify the behavior of the system at specific steps described in the methodologies above in order to accomplish one or more economic or operational objectives for the network operator.

For instance, evaluation of the request from a femtocell for resources (e.g., frequency spectrum) may include an analysis of the incremental cost, revenue, and/or profit associated with the various allocation options (allocation to the requesting femtocell, or denial of the request and allocation to another femtocell, or to a static base station). These "business rules" may be imposed for example at time of resource request, and then maintained for a period of time (or until an event triggering a re-evaluation occurs), or alternatively according to a periodic or even randomized or statistical model. In another variant, the party who owns the resources is tasked with making business-related decisions.

As yet another alternative, the femtocell may be equipped with logic (e.g., a business rules engine or component thereof, such as a client portion of a distributed software application) that is configured to analyze and make business or operational decisions relating to the business model between the client device (e.g., UE) and the femtocell. For instance, the femtocell may preferentially process or allocate resources to certain requesting users based on their status (e.g., as existing subscribers of the service provider associated with the Core Network, the type of service requested and revenue/profit implications associated therewith, etc.)

Myriad different schemes for implementing dynamic allocation of resources will be recognized by those of ordinary skill given the present disclosure.

It will be recognized that while certain aspects of the invention are described in terms of a specific sequence of steps of a method, these descriptions are only illustrative of the broader methods of the invention, and may be modified as required by the particular application. Certain steps may be rendered unnecessary or optional under certain circumstances. Additionally, certain steps or functionality may be added to the disclosed embodiments, or the order of performance of two or more steps permuted. All such variations are considered to be encompassed within the invention disclosed and claimed herein.

While the above detailed description has shown, described, and pointed out novel features of the invention as applied to various embodiments, it will be understood that various omissions, substitutions, and changes in the form and details of the device or process illustrated may be made by those skilled in the art without departing from the invention. The foregoing description is of the best mode presently contemplated of carrying out the invention. This description is in no way meant to be limiting, but rather should be taken as illustrative of the general principles of the invention. The scope of the invention should be determined with reference to the claims.

What is claimed is:

1. A method of operating a cellular network having femtocells, the method comprising:
   receiving, by a processing device, a registration request from a least one of the femtocells;
   obtaining, by the processing device, information relating to at least: (i) the operating environment of the at least one femtocell; and (ii) the current operational state of the network; and
   based at least in part on the information, enabling a plurality of operating modes, the enabling of the plurality of the operating modes causing the at least one femtocell to select only one of the plurality of operating modes, the selection based on:
      evaluating the information relating to the current operating state of the network to determine the level of loading or congestion within the network; and
      where the loading or congestion within the network is determined to be sufficiently high, causing the at least one femtocell to assume a partly autonomous operating mode, the partly autonomous operating mode allowing for the at least one femtocell to operate with only intermittent communication with the network; and
   wherein the plurality of operating modes comprise varying levels of active network supervision.

2. The method of claim 1, wherein the plurality operating modes comprise:
   a first mode that allows the at least one femtocell to operate substantially autonomously of the network;
   a second mode that comprises the partly autonomous operating mode, the partly autonomous operating mode comprising at least one constrain on the resources accessible by the at least one femtocell; and
   a third mode that requires the at least one femtocell to operate substantially under control of the network.

3. The method of claim 1, wherein the selection further comprises:
   evaluating the information relating to the operating environment of the at least one femtocell to identify the presence of one or more nearly femtocells or other emitters;
   where the presence of one or more nearby femtocells or other emitters is indicated, determining whether the one or more nearby femtocells or other emitters belong to the same network; and
   where the one or more nearby femtocells or other emitters belong to the same network, causing the at least one femtocell to assume a network-controlled operating mode, the network-controlled operating mode allowing for selective allocation of resources between the at least one femtocell and the one or more nearby femtocells or other emitters.

4. Network apparatus capable of arbitrating between a plurality of operating modes for a femtocell in communication therewith, the apparatus comprising:
a processing device in data communication with a memory;
an interface subsystem configured for data communication with the femtocell; and
a plurality of executable instructions resident within the memory that are configured to, when executed by the processing device, cause the processing device to:
receive a plurality of information from the femtocell via the interface subsystem;
determine one or more internal operating conditions;
based at least in part on the received information and one or more internal conditions, select an operating mode for the femtocell, where:
the selected operating mode is based at least on:
evaluating the information relating to the current operating state of the network to determine the level of loading or congestion within the network; and
where the loading or congestion within the network is determined to be sufficiently high, causing the at least one femtocell to assume a partly autonomous operating mode, the partly autonomous operating mode characterized in that the at least one femtocell operated with only intermittent communication with the network; and
signal a plurality of frequency resources selected from an available pool of frequency resources, the femtocell to select one of the plurality of frequency resources, the selection occurring without further network control.

5. The apparatus of claim 4, wherein the selection of the operating mode comprises selection of a mode from the group consisting of:
a first mode that allows the femtocell to operate substantially autonomously of the network;
a second mode that comprises the partly autonomous operating mode that allows the femtocell to operate at least partly autonomously of the network, the at least partly autonomous operation comprising at least one constraint on the resources accessible by the femtocell; and
a third mode that requires the femtocell to operate substantially under control of the network.

6. The apparatus of claim 4, wherein the network comprises at LTE (Long Term Evolution) compliant cellular network, and the femtocell comprises an HeNB (Home NodeB).

7. The apparatus of claim 6, wherein the apparatus comprises an EPC (Evolved Packet Core) entity of the LTE-compliant network.

8. The apparatus of claim 4, wherein the plurality of information comprises information relating to the existence of one or more RF emitters proximate to the femtocell.

9. A non-transitory computer readable storage medium with an executable program stored thereon, wherein the program instructs a processor to perform operations comprising:
receiving a registration request from a femtocell;
obtaining information relating to at least: (i) the operating environment of the femtocell; and (ii) the current operational state of the network; and
based at least in part on the information, enabling a plurality of operating modes, the enabling of the plurality of the operating modes causing the femtocell to select only one of the plurality of operating modes, the selection based on:
evaluating the information relating to the current operating state of the network to determine the level of loading or congestion within the network; and
where the loading or congestion within the network is determined to be sufficiently high, causing the femtocell to assume a partly autonomous operating mode, the partly autonomous operating mode allowing for the femtocell to operate with only intermittent communication with the network; and
wherein the plurality of operating modes comprise varying levels of active network supervision.

* * * * *